(12) United States Patent
Reinfeld et al.

(10) Patent No.: US 6,802,693 B2
(45) Date of Patent: Oct. 12, 2004

(54) VORTEX ATTRACTOR WITH VANES ATTACHED TO CONTAINING RING AND BACKPLATE

(75) Inventors: David Reinfeld, Englewood, NJ (US); Lewis Illingworth, Kensington, NH (US)

(73) Assignee: Vortex Holding Company, Avenel, NJ (US)

( * ) Notice: Subject to any disclaimer, the term of this patent is extended or adjusted under 35 U.S.C. 154(b) by 43 days.

(21) Appl. No.: 10/132,061

(22) Filed: Apr. 25, 2002

(65) Prior Publication Data

US 2002/0155001 A1 Oct. 24, 2002

Related U.S. Application Data

(63) Continuation of application No. 09/316,318, filed on May 21, 1999, now Pat. No. 6,595,753.

(51) Int. Cl.[7] .............................................. F04D 29/30
(52) U.S. Cl. .................. 416/1; 416/185; 416/182; 416/186 R; 416/189; 416/181; 416/231 R; 415/90; 415/1; 415/58.2
(58) Field of Search ............................. 415/58.2, 58.6, 415/90, 91, 211.2, 224, 226, 228, 1; 416/179, 182, 185, 183, 186 R, 188, 189, 181, 231 R, 1

(56) References Cited

U.S. PATENT DOCUMENTS

| | | | | |
|---|---|---|---|---|
| 595,571 | A | * 12/1897 | Johnsen | 416/60 |
| 1,548,082 | A | * 8/1925 | Wise et al. | 415/228 |
| 1,842,213 | A | * 1/1932 | Smellie | 416/175 |
| 1,875,451 | A | * 9/1932 | Harris | 416/170 R |
| 1,910,443 | A | * 5/1933 | Mobley | 416/189 |
| 2,409,230 | A | * 10/1946 | Taylor | 415/121.2 |
| 2,962,999 | A | * 12/1960 | Fortune | 416/62 |
| 3,060,702 | A | 10/1962 | Price, Jr. | |
| 3,167,145 | A | 1/1965 | Mackie | |
| 3,215,218 | A | 11/1965 | Hurst | |
| 3,233,693 | A | 2/1966 | Havercamp | |
| 3,274,410 | A | * 9/1966 | Boivie | 416/183 |
| 3,394,906 | A | 7/1968 | Rogers | |
| 3,561,558 | A | 2/1971 | Parkhouse | |
| 3,635,448 | A | 1/1972 | Okada | |
| 3,691,670 | A | 9/1972 | Lemelson | |
| 3,810,515 | A | 5/1974 | Ingro | |
| 3,926,277 | A | 12/1975 | Shino et al. | |
| 3,955,642 | A | 5/1976 | Shino et al. | |
| 4,011,827 | A | 3/1977 | Fond | |
| 4,038,182 | A | 7/1977 | Jenkins | |

(List continued on next page.)

FOREIGN PATENT DOCUMENTS

| | | | | |
|---|---|---|---|---|
| DE | 19806507 A1 | 8/1999 | | |
| EP | 0134361 A1 | 3/1985 | | |
| FR | 2241211 A | * 3/1975 | ............. | 416/231 R |
| GB | 754055 A | * 8/1956 | ............. | 416/231 R |
| IT | 602318 A | * 2/1960 | ............. | 416/170 R |

*Primary Examiner*—Christopher Verdier
(74) *Attorney, Agent, or Firm*—Ward & Olivo

(57) ABSTRACT

A vortex generating apparatus has the capability of attracting and removably adhering one or more solid objects. The apparatus comprises an impeller housed within a shell. The vortex attractor generates a vortical fluid flow generally in the form of a helical or spiral shaped flow. The fluid flow creates a low pressure region extending from the impeller end of the device. This low pressure region is contained by the walls of the fluid flow, thus directing the attractive forces toward a surface and minimizing effects of ambient fluid on the system. When the surface is part of a stationary object, wall, floor or ceiling, the vortex attractor may move toward and adhere to the surface. When the surface is part of a movable object, the vortex attractor may attract the object and maintain the attracted position.

44 Claims, 17 Drawing Sheets

U.S. PATENT DOCUMENTS

| | | | |
|---|---|---|---|
| 4,052,950 A | 10/1977 | Hirata | |
| 4,174,081 A | 11/1979 | Sardanowsky | |
| 4,202,518 A * | 5/1980 | Burnham et al. | 244/12.1 |
| 4,249,334 A | 2/1981 | Goldfarb et al. | |
| 4,404,706 A * | 9/1983 | Loyd | 415/121.1 |
| 4,579,187 A | 4/1986 | Taylor | |
| 4,604,960 A | 8/1986 | Wachi | |
| 4,619,217 A | 10/1986 | Wachi | |
| 4,697,536 A | 10/1987 | Hirata | |
| 4,801,310 A | 1/1989 | Bielefeldt | |
| 4,815,926 A | 3/1989 | Chaffee et al. | |
| 4,831,757 A | 5/1989 | Sheehan | |
| 4,836,748 A * | 6/1989 | Church | 416/181 |
| 4,928,663 A * | 5/1990 | Nevin et al. | 416/223 R |
| 4,964,835 A | 10/1990 | Suto | |
| 5,014,803 A | 5/1991 | Urakami | |
| 5,078,880 A | 1/1992 | Barry | |
| 5,174,222 A | 12/1992 | Rogers | |
| 5,194,032 A | 3/1993 | Garfinkel | |
| 5,272,604 A | 12/1993 | Lin | |
| 5,487,440 A | 1/1996 | Seemann | |
| 5,503,526 A * | 4/1996 | Neils et al. | 416/63 |
| 5,564,963 A | 10/1996 | Chan | |
| 5,634,839 A | 6/1997 | Dixon | |
| 5,672,086 A | 9/1997 | Dixon | |
| 5,692,262 A * | 12/1997 | Haupt et al. | 415/121.1 |
| 5,706,843 A | 1/1998 | Matsuo | |
| 5,730,553 A | 3/1998 | Miura et al. | |
| 5,741,118 A * | 4/1998 | Shinbara et al. | 416/186 R |
| 5,914,416 A | 6/1999 | Thode | |
| 5,919,078 A | 7/1999 | Cassidy | |
| 5,947,051 A | 9/1999 | Geiger | |
| 6,109,864 A * | 8/2000 | Schofield et al. | 415/90 |
| 6,595,753 B1 * | 7/2003 | Illingworth et al. | 416/185 |

* cited by examiner

VORTEX ATTRACTOR WITH VANES ATTACHED TO CONTAINING RING AND BACKPLATE

CROSS REFERENCE TO OTHER APPLICATIONS

This application is a continuation of application entitled "Vortex Attractor", Ser. No. 09/316,318, filed May 21, 1999 now U.S. Pat. No. 6,595,753.

FIELD OF THE INVENTION

The present invention relates to a vortex generating apparatus and more particularly to an apparatus that produces a captive vortex capable of attracting and removably adhering one or more solid objects or removably adhering to the apparatus itself to a surface.

BACKGROUND OF THE INVENTION

The use of vortex forces is known in various arts, including the separation of matter from liquid and gas effluent flow streams, the removal of contaminated air from a region and the propulsion of objects. However, vortex forces have not previously been provided in a device capable of attracting and/or removably attracting itself to other solid objects.

There are several patents related to the use of a vortex for separation. Bielefeldt U.S. Pat. No. 4,801,310 and related U.S. Pat. No. 4,848,991 teach methods of separating particles using centrifugal forces within a vortex chamber. A mixed fluid flow is directed tangentially into the cylinder of a vortex chamber inclined toward the opposite end of the cylinder. The process is said to separate heavier solid or liquid particles from lighter gas or liquid flow. The lighter fluid flow is directed toward the center of the vortex chamber and is collected with separate suction tubes, while the heavier particles are directed to the outer periphery and along the length of the vortex chamber for collection by a separate apparatus. In this system, the heavier particles are separated by the centrifugal forces created within the vortex chamber separator. A constant stream of fluid passes through a vortex chamber. While the process may attract particles to the periphery of the vortex chamber, they are collected within the chamber and removed with a separate device. The invention disclosed in Bielefeldt differs greatly from the vortex apparatus of the present invention, which uses the vortex forces to attract or suspend objects in a controllable manner.

In addition to the centrifugal forces of vortex apparatuses, low pressure regions created by vortex airflow which attract fluid streams have been taught. For example, Barry U.S. Pat. No. 5,078,880 teaches an apparatus for desalinating water. The vortex generating apparatus in Barry consists of a discontinuous cylinder having a cross section of a spiral. When a continuous stream of air is directed toward an inlet opening in the spiral, the air swirls into the interior of the cylinder and creates a spinning tower of air, or a vortex. A water stream is attracted to the area of low pressure at the vortex and travels through the apparatus, with the salt being separated by centrifugal forces. Unlike the present invention, this apparatus cannot be used with large solid objects. In addition, Barry is not capable of attracting and removably adhering to objects for disposal, transport, mounting, or otherwise.

Vortex vents are proposed by the Vortex Technology Center at the University of Houston to remove contaminated air from a defined region in place of conventional vents, where air is extracted from a general area. More specifically, the Vortex Technology Center proposes an apparatus that creates a swirling suction flow of air. A swirler is activated in a manner that draws air spirally upward through an exit area above. This swirling motion creates a reverse vertical flow near the axis of the swirler. According to the University, this is more efficient and convenient than conventional hoods for removing contaminated air from a directed region. However, unlike the present invention, this apparatus is not capable of attracting and removably adhering objects.

Attempts have also been made to develop thrusters to vertically propel an object using a vortex airflow. For example, the Vortex Technology Center proposes an apparatus which is capable of vertically ascending. This device, described in more detail herein, consists of a chamber header, a cargo area and swirler. At the base of the chamber header is a high pressure input source. Air enters through the high pressure input source to the swirler, which provides angular momentum to the airflow. The airflow is forced out and around the body of the chamber header over diffusers. The lack of air pressure directly above the axis of the swirler creates a low pressure region, which is said to create upward lift. This apparatus differs from the vortex generating apparatus of the present invention as it is not capable of lifting and holding objects, nor is resistance minimized by limiting overall airflow.

These apparatuses proposed by the Vortex Technology Center (the vortex vent and the vortex thruster) use the pressure differences created by the vortex airflow to provide a directed low pressure region. They describe the "artificial tornado" theory in conjunction with the illustrations presented on the Vortex Technology Center's webpage. However, while they may be similar to a tornado because they use spirally flowing air to create a pressure difference, they do not take advantage of the potential forces that may be generated by emulating the flow of a natural tornado.

A tornado is a strongly rotating column of air, or vortex, generally attached to the base of a thunderstorm cloud and extending to a tip. The pressure in the center of the rotating column is lower than ambient and becomes lower still as the tip of the column approaches and attaches the ground or a solid surface such as a roof. If the vortex or vortices are not connected to the base of a cloud, they are not tornadoes, but rather are termed "gustnadoes". The devices proposed by the Vortex Technology Center do not use the principles of a connected tornado, but instead resemble an unconnected tornado.

Many devices and methods are used to attract solid objects or particles. A common method is with the use of suction generated by a vacuum. The operation of an impeller vacuum system is described and contrasted with the present invention in further detail herein. Briefly, a motor driven impeller causes a circular fluid motion within its vanes, whereby the centrifugal force or centripetal acceleration throws fluid out through an exhaust. Pressure is reduced and fluid is drawn into the inlet and through the impeller blades to the exhaust.

However, the vortex attraction force created by the present invention is distinguished from a typical vacuum impeller system. In contrast, rather than providing a continuous flow of fluid through the impeller the present invention prevents fluid flow radially through the spinning impeller blades, which improves efficiency over a conventional vacuum impeller as described herein.

Other methods of attracting or displacing solid objects or particles (on both large and small operational scales) include cranes, forklifts, springs, slide assemblies, hydraulics or electromagnets. However, the vortex generating apparatus of the present invention provides an efficient and versatile substitute for existing lifting or displacement methods and devices. For example, unlike electromagnets, the present invention is not limited to displacing or attracting objects having magnetic properties. Additionally, unlike traditional forklifts and cranes, no pallets, straps or chains are required to lift objects. In addition, the present invention may be configured to attract a surface of an object, which cannot be acheived with a crane, forklift, etc. Other benefits will become apparent from the summary and descriptions set forth herein.

Furthermore, devices using the invention herein may be configured to attract themselves to a solid surface. Prior methods of removably adhering devices to solid objects include magnets and suction cups. However, magnets and suction cups do not offer control and predictability of movement which are possible with the present invention.

Heretofore unknown to the present inventors is a device utilizing the principles of a connected tornado for optimum attraction force. These attraction forces are generated by a vortex apparatus that may be used for attracting and removably adhering solid objects or for removably adhering itself to a surface. The prior art does not contain an apparatus utilizing the negative pressure created from a vortex force to accomplish the objectives relayed herein.

SUMMARY OF THE INVENTION

The present invention is directed to an efficient apparatus capable of generating a negative pressure region that produces attractive forces in the form of a vortex flow (also referred to herein as a "vortex attractor"). The vortex attractor may be used alone or in conjunction with other mechanical or electronic systems. The present invention has the functional ability to pull, suck, suspend, hold, lift and interrupt. The negative pressure regions also can adhere to a vortex attractor to a surface. For example, an apparatus is provided that is capable of pulling itself toward a surface or maintaining itself a certain distance relative to a surface. Furthermore, the fluids that may be acted on by the present invention include any gas (e.g., air), liquid (e.g., water), any combination thereof, slurries, or any gas and/or liquid having solids and/or particulates dispersed therethrough.

These general uses and additional examples described herein are accomplished by providing an apparatus comprising one or more impellers or vanes, and a shell. The impeller or impellers are positioned within a shell that has one open end, or impeller end. Materials of construction for a vortex attractor will vary depending on the desired application.

The shell comprises a containing ring or wall and a backplate for said wall. The containing ring or wall may be attached to the impeller vanes and rotate with them or may be separate from the vanes (but relatively close to the vane ends) and may be mounted on a stationary frame. The backplate may be connected with the impeller vanes and rotate with them or may be separate from the vanes (but again, relatively close to the vanes), and may be mounted to a stationary frame. The containing ring, backplate, and/or impeller vanes may be sealed such that fluid cannot flow radially through the vanes or backwards behind them. Alternatively, the containing ring and/or backplate may have apertures or vents in them to allow for some fluid to circulate radially and behind. These apertures or vents preferably are configured such that sufficient surface area remains upon the containing ring, impeller vanes, and/or backplate to act upon the fluid and induce a vortex flow. Furthermore, the apertures or vents may be controllable in order to rapidly reduce attraction. The fluid flow through the vents may be used to power auxiliary functions or for measurement control.

The impellers rotate about an axis within the containing ring. The axis typically corresponds with a driveshaft which passes through the backplate. Generally, the impellers rotate about a central axis of the containing ring or wall. However, this axis may be positioned other than centrally depending on the impeller configuration, the shape of the containing wall and the particular application. The impellers or vanes may be incorporated in the containing walls, or may be separately rotatable. The vanes may be flat, curved or pitched and various configurations are possible, as further described infra.

The device may optionally include a safety screen or ring, or may have a shield mounted on the vanes in a manner that does not obstruct fluid flow in directions necessary for correct operation of the vortex attractor. Such shields are for safety purposes or to prevent the possibility of obstructions within the vanes.

The shape of the shell may vary depending on aesthetics, functionality or efficiency requirements. One particularly useful effect of differing shapes of the shell is the variations in the shape of the fluid flow. The containing wall may have a plan view resembling a circle, ellipse, polygon or polygon having rounded vertexes or corners. The containing walls may be perpendicular to the backplate or may be at an acute or obtuse angle relative to the backplate. Furthermore, the containing walls may be straight, arcuate, U-shaped, V-shaped (with the open portions of the "U" or "V" facing away from or toward the impeller) or S-shaped (which may also be in the form of a backwards "S"), for example.

When the backplate is not connected to the impeller blades an aperture is provided for the driveshaft to rotatably pass through said backplate. If a completely sealed backplate is required, the driveshaft may pass through a sealed and lubricated gasket or bearing assembly. The backplate, whether connected to the impeller blades, or separate from them, may also contain one or more additional apertures or slits. These additional apertures or slits may be provided to minimize weight, for decorative purposes or to provide any desired functionality related to a specific configuration or application. These additional apertures or slits may be provided in order to generate external fluid flow for auxiliary functions or monitoring.

Moreover, it is not necessary that the backplate be planar. The backplate may be convex or concave, or it may be shaped like a cone, pyramid, truncated pyramid or other polyhedral. Additionally, alternate designs may incorporate a backplate which is asymmetrical or irregular with respect to the vanes. Any three-dimensional shape that does not interfere with the impeller action may serve as the backplate.

The driveshaft may be powered by any conceivable means, such as AC or DC electric motors, gas or fuel combustion motors, steam power, compressed gas or air, flywheel or a mechanical winder device. The driveshaft may be of any length or shape, and it may be flexible, allowing for optimum positioning and maneuverability of the vortex attractor. Power may be provided directly from the motor to the driveshaft, or by one or more drive belts or chains connecting the driveshaft to the motor. Optional gears may be provided which allow the driveshaft to reverse the direction of rotation or allow for the speed of the impeller to be controlled. Alternative drive mechanisms may also be used, such as water, wind or magnetic arrangements. Furthermore, the power source may also provide energy to additional devices fixed to the vortex attractor.

Preferably, the containing ring height should be similar to that of the impeller. A stationary containing ring may be made to extend above the height of the impeller so that when the vortex attractor pulls an object or pulls itself toward a surface, the edge of the containing ring contacts the object or surface rather than the blades of the impeller. Alternatively, the containing ring wall height may vary around the impellers, for example, to provide a means to direct the vortex flow. Other arrangements may include a flexible or adjustable containing wall, so that when the impeller end contacts a non-planer surface, ambient fluid can be prevented from entering the system.

The forces of the vortex attractor are generated by the spinning impeller or impellers which act upon fluid entering from the open end of the vortex attractor. Fluid is drawn in through the region about the axis of the impellers, and it is forced through the impellers to the walls of the containing ring. The fluid flows tangentially from the containing ring in an upward direction. Generally, the path of the fluid flow resembles a spiral, with a loop that travels through the center of the spiral to the region about the axis of the impeller. The direction of the spin does not matter, as the only change would be the direction of the fluid flow and the same attractive forces are generated as described herein. The fluid flow creates a low pressure region near the axis of the impeller. Fluid is forced back toward the impellers due to the loss in velocity caused by resistance encountered from ambient fluid outside the path of fluid flow. This spiral path having a return loop through the spiral is continuous while the impellers spin. If the impeller velocity is decreased or increased, the distance of the fluid flow from the containing ring and the speed of the fluid flow will accordingly vary.

A desirable feature of the vortex attractor is that the flow through the system is limited because there is not a separate fluid intake and exhaust. The fluid circulating through the vanes of the impeller originates from the region about the impeller axis and within the confines of an imaginary frustum or cylinder extending away from the impeller end of the shell rather than from a separate inlet. This eliminates the inefficiencies created by the methods disclosed in the prior art because the system need not continuously cause a fluid flow from an intake through an exhaust.

A protective screen, plate or specific shell geometry may be applicable to position a shield in front of the impeller blades to minimize injury and to prevent objects from striking the impeller. The screen may comprise concentric circles or a spiral screen. Other arrangements include covering the region above the impeller blade path with a separate ring plate or with certain shell geometry. For example, the containing wall may be fabricated having a portion that extends toward the impeller axis to protect the vanes. Preferably, such a plate or extended portion allows fluid to flow through the region about the axis of the impeller, and allows fluid to exit through the region near the containing ring walls.

The invention described herein generates a low pressure region that extends from the impeller end to the object or objects to be attracted (or object being attracted to). The low pressure region between the impellers and the object is maintained by the impeller motion. The vortex attraction forces increase as the object moves closer to the containing ring, as there is less resistance from ambient fluid.

Another particularly useful feature of the vortex apparatus is that the distance from the impeller blades to the surface has an approximate linear relationship with the impeller operating power requirement and the attractive forces generated. The vortex power requirement increases linearly as distance increases, and the vortex lift decreases linearly as distance increases. This linearity (over part of the range of distances from the impeller blade) provides predictability and efficiency in applications where the vortex apparatus of the present invention is maintained a certain distance from a stationary or non-stationary surface. Objects may be suspended a distance from the vortex attractor (rather than be removably adhered), or alternatively, the vortex attractor may be suspended a distance from a stationary surface. For optimal suspension, a responsive control system is provided which senses any change which may effect the required impeller speed and adjusts the speed accordingly. Moreover, the linearity proves useful for control mechanisms, motion sensors, measurement devices or speed detectors. Outside fluid effects, such as wind, turbulence or deterioration of the fluid flow from movement of the vortex device should be taken into consideration when fluid is between the impeller and the surface (note that this is not a major factor when the object is removably adhered to the vortex attractor, as little or no additional fluid flows from the ambient surrounding acts upon the system).

Furthermore, the pressure differential (and hence the attractive forces) may be varied for certain applications (i.e., maintain separate distances between the impeller end and the surface) by changing the speed of the impellers. The impeller speed can be changed by varying the power input or with a gear transmission system. Additionally, a gear transmission may also relay power from the impeller power source to auxiliary devices.

The principles of the vortex flow and reduced pressure are applicable in multiple applications, on scales ranging from microscopic to very large. The vortex attractor may be used alone, in combination with wheels or tracks, on a conveyor belt, etc. Various devices may be attached to the vortex attractor for sensing, measuring, recording, etc. A warning system may be provided for vortex attractors operating on a limited power source, such as a battery, to prevent the attractor from failing while in use. Furthermore, the vortex attractor may be controlled manually or remotely by computer, conventional remote control or via on-board software. The controlled elements of the vortex attractor may include impeller speed, distance from the impeller to the containing ring, and power source. Controlling the impeller speed can be accomplished by varying power input or by changing gears.

A substantially modified vortex attractor comprises an impeller or vanes and a shell having an inner, shield and an outer shield. The vanes may be mounted to a backplate, or an impeller assembly may be separately rotatable relative to the inner shield. The impeller is positioned within one end of the outer shield (the impeller end), and the inner shield is concentric to the outer shield, and generally prevents fluid flow within the center of the portion of the outer shield behind the impeller assembly. Fluid is directed through the center of the impellers and spirals out through the region between the inner shield and the outer shield. Attractive forces are generated toward the impeller end of the outer shield due to the vortex flow extending therefrom.

Therefore, according to the present invention, an efficient device is provided that uses the low pressure zone created by a vortex fluid flow to attract objects to itself or attract itself to a surface. This device may be employed for numerous purposes, such as industrial transport, underwater lifting, electromagnet applications, switches, sensors, detectors, toys and other applications where objects or tools are displaced and/or maintained in a suspended or removably adhered position. Several uses are described in more detail below.

Industrial Support/Lifting Devices

In the field of industrial transport, a vortex attractor may be used in place of or in addition to a crane or other hoisting machinery. It can be used to lift, hold, and move objects across a factory or warehouse. This type of vortex attractor may be particularly useful in lifting, holding and/or moving delicate objects such as glass panes. Furthermore, the object lifted may have a non-planer surface. As described further herein, the vortex attractor requires less energy than vacuum systems. Additionally, unlike a magnet or electromagnetic crane, magnetic properties of the attracted object are relevant here.

An assembly including one or more vortex attractors may be suspended from a ceiling track system or other suspended transport system capable of traversing about an area[1]. For example, an extendable and retractable cable may be suspended from a ceiling track system within a plant that travels in the x axis and y axis. A vortex attractor having the impeller end facing the ground is provided at the opposite end of the cable. When the attractor is positioned no more than some maximum distance (based on the weight of the object, the size of the attractor and the impeller speed) over the object to be moved, the impellers are activated. This causes the object to rise, preferably contacting the impeller at either the containing ring or the outer shield. The track system may then be activated to traverse the plant and the cables may be extended and retracted as needed. Alternatively, the objects may be suspended a distance away from the vortex attractor.

[1] See discussion infra regarding vortex attractors including wheels or ball bearings capable of traversing a wall or ceiling. In situations where a suspended object is moved, the effects of the changed fluid flow must be considered to maintain the proper impeller speed. Note that this is not a factor when the object is removably adhered to the vortex attractor, as no additional fluid flow acts upon the system. When moving a load attached to the vortex attractor, there are no adverse effects on the low pressure generated (assuming the minimum impeller speed for that load is maintained). In an alternate arrangement vortex attractors may be used in place of the overhead track system to traverse the ceiling while suspended vortex attractors perform the above mentioned lifting functions.

Vortex attractors are also applicable as substitutes for forklifts or on flatbed trucks with winch or overhead forklifts attached for loading and unloading. This may be similar to the suspended systems described above, using a boom in place of or in conjunction with a tracking system. However, other arrangements are contemplated, including a rigid arm system, for instance, where the vortex attractor is attached to the extremity and the arm is capable of moving, extending and retracting. Often, the objects lifted by these various arrangements are fragile or easily subject to scratching or marring from conventional forklifts. A vortex attractor may perform the tasks of a forklift or suspended forklift capable of moving large delicate objects without breakage or scratching them. This is accomplished, for example, by providing a non-marring surface on the impeller end of the containing ring or outer shield, i.e. providing a cushion between the vortex attractor and a delicate object.

Similarly, a vortex attractor is useful as a lifting device for physically handicapped people. The forces required to displace access platforms and chair lifts in vehicles or homes may be provided by a suspended vortex attractor or a vortex attractor attached to a boom. Furthermore, a lifting device may be created which comprises a vortex attractor attached to a flexible or non-flexible pole to aid in lifting commonplace objects such as cups, boxes, etc.

The driveshaft of a vortex attractor may be flexible. Such a driveshaft configuration may be incorporated as a portion of a suspended attractor (at the attractor end of the cable), as a portion of or substitute for an attached arm, or on a hand-held device. This is useful, for example, on an assembly line, where the vortex attractor can maintain an object in a desired position while it is mounted in place. Another use of a vortex attractor having a flexible driveshaft is as a tool for holding or retrieving an object or workpiece in a tight area. For example, a mechanical snake having an attractor on one end may be directed through a wall or ceiling. Optimally, sensors and remote control capability are included for enhanced accuracy.

Furthermore, if a screen or protective ring is placed in front of the impeller end, the vortex attractor may be used to lift piles of objects which would otherwise lodge within the impeller assembly. The objects would instead adhere to a screen, preferably constructed of concentric rings, and may be removed from the vortex attractor by reducing impeller velocity. For example, loose objects may be adhered to the screen until the flow is sufficiently obstructed to prevent attractive forces.

Also, various waste can be collected using a vortex attractor shell comprising an inner shield and an outer shield. The impellers in such an arrangement are preferably protected by a ring or plate, and the center of the impeller assembly remains open. Waste is collected by the vortex flow and travels through the impellers and may be discharged into a separate collecting bin. Alternatively, the inner shield may serve to both guide the flow (about the outside wall of the inner shield) and collect the debris.

Objects can also be lifted underwater using a vortex attractor. A vortex attractor will provide a low pressure region near a surface of an object and adhere itself to the surface. This is very useful for removing objects underwater or within other fluids without disturbing the ground under the object, thereby preserving the underlying terrain.

Toys and Amusement

In addition to industrial and commercial uses, the vortex attractor of the present invention can be the core of various toys. Safety is a major concern with children, so a safety plate, ring or screen of concentric members may be mounted on the face of the impeller end. A lifting toy can be created, which is capable of lifting and holding an object. The forklift and crane replacements described above may be recreated on a smaller scale for various toys and models. A vortex attractor may be provided at an end of a rigid or flexible arm or handle to create a toy in the form of a hollow tube or wand, which, when the impellers are caused to spin, creates a low pressure area capable of attracting and holding objects. The hollow tube may also be flexible, with the vortex attractor at one end driven by a flexible driveshaft. This type of lifting toy may be incorporated in various games including games of skill, or to improve hand-eye coordination and response time. A variation of a lifting toy may also included with building blocks and mechanical model sets, including sets using interlocking blocks and or separate fasteners.

This lifting arm or handle can also be incorporated on toys such as dolls or action figures so that the toy is capable of holding an object without having predetermined grooves or openings. A toy may be created which can throw an object by providing arm motion coupled with timed vortex release of an attracted object. Additionally, vortex attractors may be provided at the feet, hands, knees or posterior of dolls or action figures, allowing it to stand, sit or kneel in any position, and more complex toys and models may be created which can crawl, walk, run or sit. When sufficient draw force is provided by the vortex attractors, the toy may be capable of walking or crawling across a floor, up an incline or vertical wall, and across a ceiling.

Various positions of vortex attractors will increase the crawling or climbing capabilities. For example, a slithering toy resembling snake or worm may be created using multiple vortex attractors. Essentially, several attractors are placed within a flexible tube at various positions and facing various directions. The attractors may be controlled in a pattern or randomly by on-board software or manually by remote control. The toy can slither across a floor, climb walls and scale ceilings. Additionally, various types of insects, arachnids, reptiles, dinosaurs, mammals or fictional creatures may be created having vortex attractors at the extremities and tails. Controls, on-board or remote, allow the creature to move by activating, reversing and deactivating certain attractors. Optionally, vortex attractors can be placed in other areas, for example the backside or underside to allow the creature to lay flat, roll over, etc. Any of the action figures, creatures, etc. described may be made on a larger, even life size, scale using the attractor positioning and activation to simulate movement. These are useful for various entertainment purposes such as movies and other displays, but in certain applications may also prove to be efficient devices to transport various tools and materials.

A toy car, truck, boat, train, etc. may also be created with a vortex attractor. One type of toy car comprises wheels and one or more vortex attractors having impeller ends substantially perpendicular to the plane of the wheelbase. The wheels may also be powered by conventional means. The toy car will "propel" if the vortex attractor is placed toward a wall or other solid object. Vortex actuation, power, steering, or other functions may be controlled remotely or with on-board software. When the vortex attractor is actuated, the toy car will move toward a wall or object opposite the impeller end because of the low pressure region created between that surface and the toy car. By activating an additional attractor on the toy, for example on the opposite end, the toy will "propel" toward another wall or object. Several of such toys can be combined with a toy bumper car rink, where bumper cars are simulated with the additional feature of attracting toy cars to each other and maintaining the captive state.

Another type of toy car, truck, boat, train, etc. may include a vortex attractor having an impeller end facing the plane of the wheelbase. The wheels (or rollers, tracks, casters or ball bearings) may share the power source of the impeller or may operate from a different power source. If certain types of casters or ball bearings are provided, the toy car may traverse omnidirectionally over a surface, rather than separately in the x-axis direction and in the y-axis direction. The vortex attractor placed essentially on the underside of the toy car allows it to climb up a wall and across a ceiling when the attractive forces are actuated. This type of device, also referred to as "climbing attractors", are described further in relation to other applications.

Any of the toys and entertainment devices described may be used alone or in conjunction with a board game, story, book, or computer or video game. For example, for use with a computer game or story, the power input may be measured and other sensors included on the toy with appropriate peripheral hardware and software to relay the information about the toy's position to the game or story. Also, various mazes and labyrinths may be created by using the principles of the bumper cars, described supra, with multiple vortex attractors on a multi-sided shape (movement similar to creatures) or with various climbing attractors described supra.

A vortex attractor may also be used to suspend an object from a ceiling or wall. For example, an attractor may be provided that adheres to a ceiling and includes a cord or flexible member attached to an object. The object may be of any variety, such as toy airplanes, helicopters, rocket ships, flying saucers, lighted or illuminated forms and still frame and video cameras. The cord may be controlled to spin the object, or a flexible gooseneck attachment may be provided.

On a larger scale, many of the above described toys may be created for props and simulated scenes in the movie and entertainment industry, museums, displays and other exhibits. For example, video cameras may include a vortex attractor attached directly thereon or attached at the opposite end of a cord, rod or gooseneck. It may be positioned anywhere in a set on a surface. Wheels or casters and various remote and/or computer controls are used to easily position the camera.

Props may also be hoisted, pulled, suspended or held by vortex attractors. For example, props or cameras may be suspended from a ceiling by a device comprising one or more vortex attractors facing the wheelbase of a caster assembly having a flexible gooseneck extending therefrom, and a second set of one or more vortex attractors attached to the opposite end (or, props or cameras may be affixed to the opposite end by other means). The caster end can track up a wall, across a ceiling and across a floor, moving the prop in any desired direction and holding it in any desired position. The same device may be reused for other props, and there is no need to construct an extensive tracking system, thereby increasing speed and efficiency. Further, vortex attractors may replace booms in various applications.

Components

Vortex attractors may also be used as a component of an electronic and/or mechanical device. For example, instruments containing circuit breakers, relays, and other switches using electromagnets, may be improved with the present invention. The role of electromagnets may be replaced by a vortex attractor without generation of a magnetic field. For example components used in conjunction with magnetic storage such as computers may be improved with the elimination of electromagnets. The absence of a magnetic field allows such a component to be located closer to magnetic storage media without fear of corruption.

Furthermore, the weight of circuit breakers, relays and other types of switches can be reduced by substituting vortex attractors for electromagnets. Magnetic metals are not necessary. Instead, one or more vortex attractors may be provided which may be fabricated of lighter material such as paper, cardboard, wood, plastic blends, rubber compounds, aluminum, etc.

Vortex forces are useful for operating switches. For example, a vortex attractor mounted opposite a sliding gate can open the gate (by spinning the impellers causing vortex attraction) and close the gate (by stopping the attraction). Changing the speed of the impeller to gradually increase and release the attractive forces of the vortex can also variably control the gate. Moreover, as discussed infra and supra, the power input requirement and attractive force are in partial linearity with the distance from the impeller to a surface. Thus with variations in power input, precise distances of the switch may be achieved and maintained and the speed of the switch in action may be controlled.

The present invention may also be employed in various types of door and window mechanisms. A vortex attractor could be used to operate a lock or deadbolt. This would allow for simplified electronic control of a structural locking device. For example, a proximity switch using the vortex attractor can operate an aircraft door. The electronic control operates to switch on and off the impeller, which draws the locking mechanism toward it. Also, a vortex attractor could be used to control a sliding door or window.

Removable Mounting Means

The attractive forces generated also may be used to removably adhere a vortex attractor having an object fixed thereon to a wall or ceiling. Security surveillance such as video, audio or motion sensors, including those described herein, is facilitated by use of the vortex attractor. Other sensors may be included for industrial surveillance via gas-detect, including specific chemicals (i.e., radon, carbon monoxide, etc.), temperature, pressure, radiation, infrared, electromagnetic field, etc. These devices comprising a vortex attractor and a sensor may be removably adhered to any surface, and is particularly useful in relatively inaccessible locations such as high walls or ceilings. A vortex attractor may be used for surveillance in locations where atomic or other radiation precludes human access such as nuclear reactors or for furnace inspection while the furnace is hot.

Other devices may be attached to a vortex attractor for functional or decorative purposes. A vortex attractor may be used to temporarily mount something to a wall or ceiling. For example, paintings, sculptures, advertising displays, shelves, projectors, masks, etc. may be adhered to a wall or ceiling with a vortex attractor. A vortex attractor may, for example, have a Velcro™ patch, a cord or a hook affixed thereon to adhere a decoration. Wall marring, holes and tape residue can be minimized. A vortex attractor may also be used as a base for a vertical object such as a mannequin, coat rack, etc.

Climbing and Traversing Apparatus

Vortex attractors may include wheels, casters or tracks attached for numerous applications, including toys, inspection, surveillance, lifting, spraying or injecting, etc. (some applications are briefly described supra). The wheels, casters or tracks may be powered by the same source as the vortex attractor or a different source. Casters may be provided which rotate freely and omnidirectionally, and typically provide a well-known ball-bearing type construction that reduces the friction as the wheels rotate. These types of casters provide smooth movement and direction change, as opposed to separate movement in the directions of the x-axis and y-axis.

A traversing apparatus may also have the capability to traverse sharp angles, for example, from a wall to a ceiling. This can be achieved by increasing the power to the impeller, as the distance from the surface to the vanes increases as an angle is traversed, or with vortex attractors mounted in various positions on the climbing device. Multiple vortex attractors are employed generally having impeller ends facing multiple wheelbases. Any functional shape may be used, such as a sphere, cylinder, cone, cube, prism, pyramid, truncated pyramid, tetrahedron, parallelepiped or rectangular parallelepiped. Wheelbases are provided on any or all faces (or portions of arcuate surfaces, as in spheres, cones and cylinders).

This type of apparatus, a traversing vortex attractor, may be controlled remotely or by on-board software. Essentially, the climbing or traversing vortex attractor may traverse a wall or ceiling by activating both the wheels and the vortex attractor. The vortex forces adhere the apparatus to the wall or ceiling and the amount of attractive forces may be varied remotely or automatically via on-board software. A traversing vortex attractor is also useful underwater or submerged in other fluids.

A traversing vortex attractor may be used for both large and small applications. To illustrate, an industrial traversing vortex attractor may include a cargo area for transporting materials or equipment up walls. Such an industrial use is applicable in situations where overhead lifting means are prevented, or when a versatile pick and place machine is desired. Additionally, a traversing vortex attractor may be configured with an additional vortex attractor suspended via a cable or other suspension means that can lift objects (as described infra).

Another device incorporates one or more miniature sensors and/or tools. This apparatus is appropriate for various purposes, such as inspections of both the outside and inside of pipes, tanks and other apparatus, performing structural evaluations of concrete or masonry walls, detecting atmospheric conditions at various heights or remote control security devices, for example. Tools provided may include pens, paint rollers, sprayers or brushes, cutting edges or tips or stampers for drawing, painting, etching or imprinting various patterns on a surface.

Optionally, a warning signal may indicate that energy reserves are low, whereupon a controller may act upon that signal to prevent the attractive forces from diminishing and the apparatus from falling. Alternatively, on-board software may be programmed to sense the diminishing energy and act appropriately, such as reverse direction for energy replacement or shut down secondary loads.

Security surveillance devices such as video, audio or motion sensors, including those described infra, may be controlled with a traversing vortex attractor. Other sensors may be included for industrial surveillance, such as gas-detect, including specific chemicals (i.e., radon, carbon monoxide, etc.), temperature, pressure, radiation, infrared, electromagnetic field, etc. These devices comprising a traversing vortex attractor and a sensor may be removably adhered to any surface and may freely move about the surface via human remote control (assisted by cameras and/or sensors where required), remote computer control, or on-board computer control.

Various materials can be sprayed from a traversing (or stationary) vortex attractor. For example, a vortex attractor may include one or more sprayers, jets or nozzles. Such a device may be used, for example, to paint a wall or ceiling by placing the vortex attractor on the surface and activating a rotating sprayer, whereby paint can be spread. A paint (or other coloring solution, including various types of invisible ink) supply may be carried by the vortex attractor, or may be separately fed through a tube. Sensors may be added for particular applications. A vortex attractor including wheels, a jet sprayer and a depth sensor may be used to locate and apply paint where existing paint is chipped.

In addition to spraying, materials can be injected from a vortex attractor. A traversing vortex attractor may be provided including an injection means. This may have particular application in new construction or maintenance. For example, a joint of a wall may be caulked with a vortex attractor comprising powered wheels, casters or tracks, an injection means and a caulk supply (either attached or fed via a tube). As with the sprayer embodiments, various sensors may also be incorporated. Such a device may be used to sense defects in a wall, as where an existing caulk or mortar joint is void, and accordingly inject the appropriate material therein.

Any of these devices incorporating a traversing vortex attractor may be modified to perform functions underwater. For example, a traversing vortex attractor incorporating various sensors can be submerged in a tank and may detect changes in the temperature, pressure, turbulence, etc. at various levels. Furthermore, a traversing vortex attractor may be used as a swimming pool cleaner and detritus collector. The low pressure region acts to both attract the apparatus to a solid surface such as a wall or floor of the pool and to dislodge dirt and other debris from the solid surface.

Sensors and Detectors

Vortex attractors may also be used as motion detectors. A spinning airflow could extend to an object suspended by the vortex forces. When the path of the spinning airflow is broken, i.e., by a foot or a tire, the suspended object would be released due to the increase in pressure. This loss of attraction of the suspended article could trip an alarm or trap, and may be automatically reset once the path of spinning airflow becomes unhindered.

The relationship between the power input and the distance between a surface and the impeller is extremely useful for sensors and detectors. For example, the distance of a surface or body may be determined by measuring the power input at that impeller position. Velocities, acceleration, drag, friction and turbulence may also be detected in a similar manner. Utilizing this relationship, vortex attractors may replace other measurement devices in weather meters such as barometers.

Another type of vortex attractor sensor can be used for windows, doors or glass panes. For example, in a window, a small vortex attractor driven by an electric motor is situated within a window frame, having the open face toward the bottom of the window. When the window is closed, very little power is required to maintain the impeller speed because there is no interference from ambient air. If a window is opened the air load on the impeller is increased and the motor slows down accordingly. The change in motor speed can be detected via sound, RF or other means. A sound, RF or other detector would indicate the variation and trigger an alarm system (i.e., sound an audio and visual alarm, emit a separate RF or other signal to a station, signal a telephone alarm service, etc.).

Miscellaneous Uses

The vortex attractor is not limited to the uses described herein. For example, in various types of vehicles, such as automobiles, trucks, trains, boats, ships, submarines (manned and unmanned), airplanes, helicopters, spacecrafts and satellites, vortex devices may be employed for many applications. As with the above-described, uses, vortex attractors may be used for door locks, window locks, power windows or sliding doors. Vortex attractors may also be used with power mirrors. With power mirrors, a single vortex attractor could be mounted behind a mirror on a circular tracking device. The mirror would be mounted on a sturdy ball-joint attachment to allow full adjustment. Additionally, several vortex attractors could be mounted behind the mirror and the appropriate combination would adjust the mirror to the user's need. Adjustable seats may also be provided wherein the base of the chair houses a plurality of vortex attractors. For example, the seat may be mounted on one ball-joint attachment, and the one or more vortex attractors could be actuated to tilt the seat in any direction by pulling the chair toward the floor. This type of seat may be used in a home, automobile, nautical device or aircraft.

Vortex attractors may also provide an active weight balancing system, which may also be used as a leveling system for any type of fixed installation, aircraft, ship or vehicle. For instance, in a tanker, vortex attractors may be placed at various positions to generate forces that may counter uneven weight distribution of the fluid in the tanker.

In a vehicle, vortex attractors may be placed at various positions on the underside to aid in balancing. This may be accomplished by a centrally located vortex attractor or multiple vortex attractors. In a system employing a single vortex attractor, when the vehicle is on a slope, the attractor is activated providing a stabilization force to aid the existing gravitational forces. In a system employing multiple attractors, appropriate attractors are separately activated to leveling the vehicle or preventing the vehicle from flipping over.

Another tool or device which may be created with one or more vortex attractors may be used as a hammer or cutting tool. Such a device comprises one or more vortex attractors and a hammer head or a cutting head. Said hammer head or cutting head is attracted to the impeller end of the vortex attractor upon activation, and is released upon deactivation. The action (hammering or cutting) may be from gravity or by other force-generating means. Such other force generating means may comprise existing art (such as means used in air chisels or electric compression chisels) or may be provided via mechanical linkage of the vortex attractor.

DETAILED DESCRIPTION OF THE INVENTION

The preferred embodiments of the apparatus of the present invention will be described in reference to the accompanying drawings. These embodiments do not represent the full scope of the invention, but rather the invention may be employed in other embodiments. Reference should therefore be made to the claims herein for interpreting the breadth of the invention. Finally, as described above, many uses exist for the invention described herein, although examples are shown with the vortex generating apparatus attracting a flat plate.

This invention makes use of a vortex of fluid flow that reduces the pressure between the source of the fluid motion, or the impellers and one or more solid objects to be attracted. The vortex attractor described herein generates a generally cylindrical vortex fluid flow component, an inner toroidal vortex, and an outer toroidal vortex, and as these forces act upon an object to draw it closer, the effects of external ambient fluid are reduced and efficiency is achieved by low fluid resistance.

Figure 1:
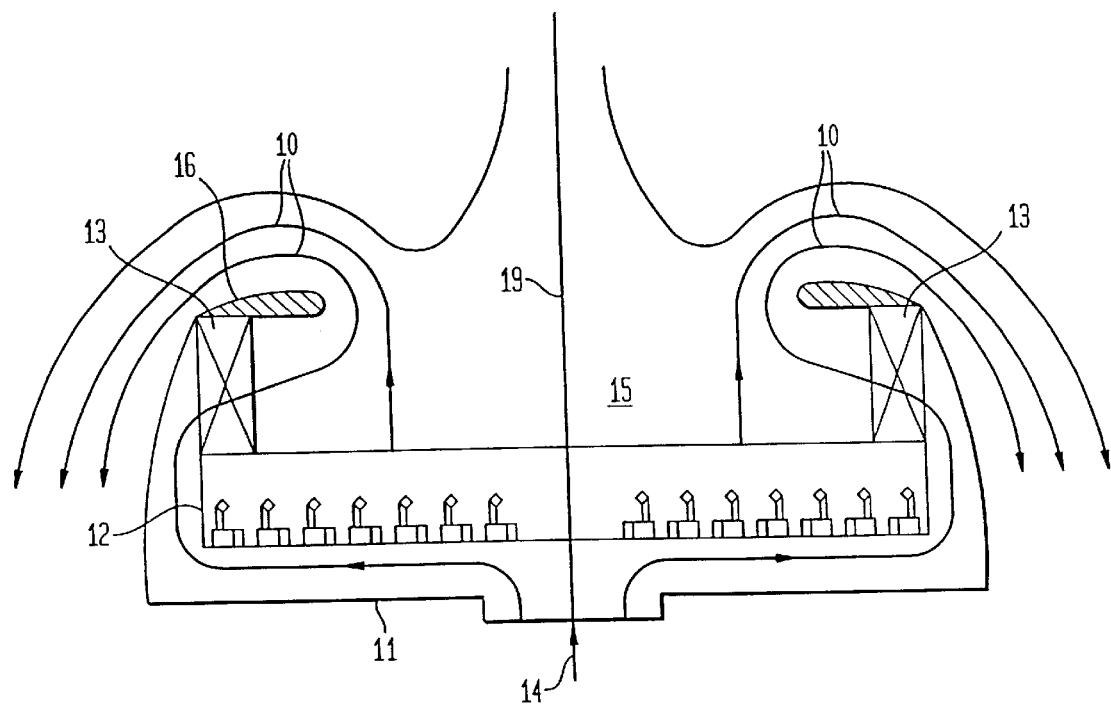
FIG. 1 depicts a prior art thruster device which uses an air intake, a swirler which spins about a central axis and an air exhaust to create pressure differentials.

Attempts have been made to use the pressure drop created around a vortex of fluid flow to propel an object. One related art apparatus proposed by the Vortex Technology Center at the University of Houston's Mechanical Engineering Department attempts to use vortex pressure differentials to propel an object. The proposed apparatus, a vortex thruster, is depicted in FIG. 1. The vortex thruster consists of a chamber header 11 which houses a cargo area 12 and swirler 13. At the base of chamber header 11 is a high pressure input source 14. Air enters high pressure input source 14 and is drawn to the swirler 13. The swirler, which spins about axis 19, provides angular momentum to the airflow. The central area about the axis 19 which is above the cargo area and extends to the height of the swirler is defined as vortex area 15. The airflow which entered via high pressure input source 14 and is forced around cargo area 12 achieves angular momentum from the swirler and exits the chamber in the direction indicated by arrows 10 over diffusers 16. Air from above the vortex region does not enter the swirler due to the low pressure area.

In the vortex thruster, the lift is said to be generated due to the pressure difference created by the low pressure area above the vortex region opposed by the high pressure on the external bottom of the chamber. However, the vortex thruster is not effective for attracting solid objects and removably adhering them.

The vortex fluid flow created by the vortex attractor described herein provides a kinetic barrier from outside fluid which would otherwise destroy the low pressure at the center. This barrier is provided from the vortex flow created by the spinning impellers. The various configurations for the backplate and containing ring discussed supra lead to different shapes of the vortex fluid flow. Further variations of the flow pattern are apparent in light of various shapes of the containing ring and backplate. To create the desired low pressure region, the flow pattern may take on any three-dimensional shape which has a plan view forming a continuous line (i.e., a circle in the cases of cylinders and cones, an ellipse, a polygon, etc.). In any configuration, the characteristics of the vortex attractor are maintained.

Figure 2A:
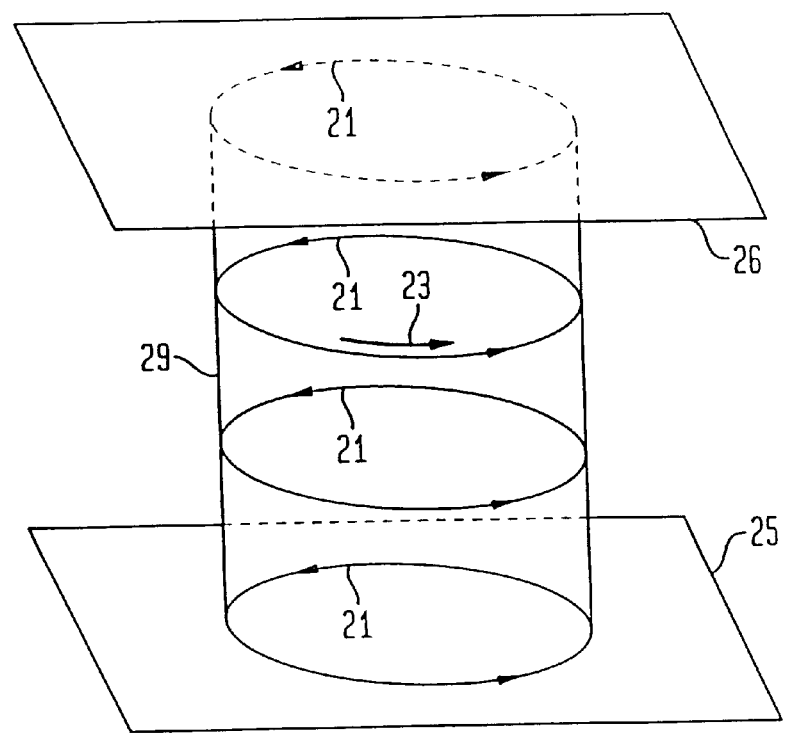
FIG. 2A depicts a vortex of fluid between two plates.
Figure 2B:
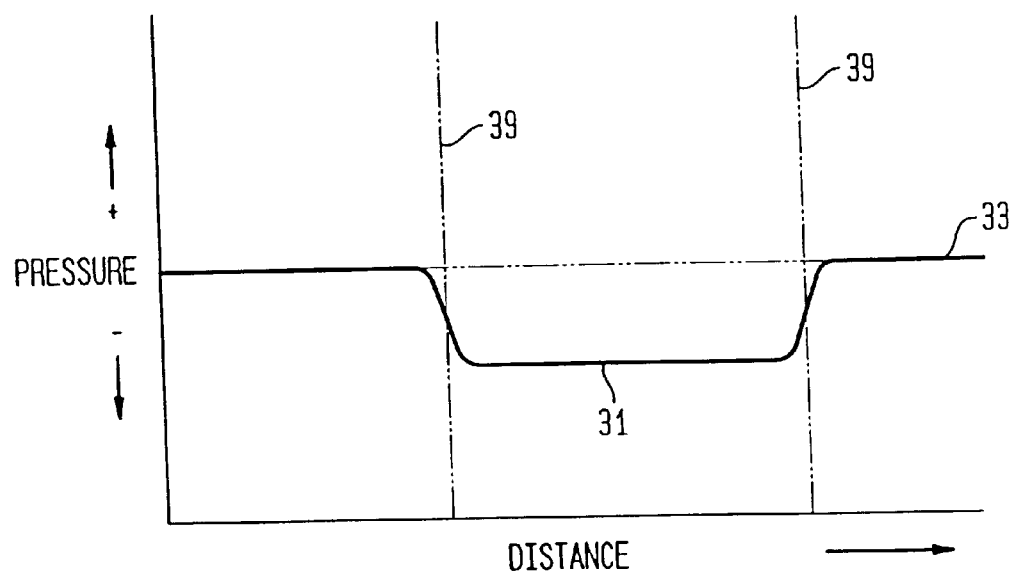
FIG. 2B depicts the pressure profile across the vortex of FIG. 2A.

A vortex fluid flow, which can generally be described as a quantity of fluid rotating about a central axis such that a barrier is formed, creates very low pressure at the walls of the barrier. FIGS. 2A and 2B depict this phenomenon with respect to a cylindrical fluid flow or vortex. FIG. 2A depicts fluid flow 21, shown as several counterclockwise rotating arrows, having a rotational velocity component 23. As noted infra, the direction of the fluid flow does not effect the low pressure regions created. FIG. 2A also depicts two parallel plates 25 and 26. The rotational velocity 23 is constant across the distance between bottom plate 25 and to plate 26. The flow 21 creates a vertical tube of fluid flow defined by vortex wall 29. Outside vortex wall 29, the pressure is ambient. Inside vortex wall 29, within the cylindrical vortex, a low pressure region is formed by the fluid flow 21. The pressure drop ΔP between the ambient fluid and lower pressure within the cylindrical vortex is represented by the following formula:

$$\Delta P = (\text{fluid density})(V^2/R) \quad (1)$$

wherein V is the velocity and R is the radius vortex wall.

FIG. 2B represents the pressure profile extending from the ambient fluid through the cylindrical vortex and to the opposing side of the cylindrical vortex to the ambient fluid. Reference numeral 39 represents the vortex wall (corresponding with vortex wall 29 of FIG. 2A). Outside of the vortex, the ambient fluid is represented on the pressure profile as pressure 33. Within the vortex, the pressure drops to a lower pressure 31.

Referring again to FIG. 2A, the plates 25 and 26 are attracted to one another by the low pressure region created within the walls 29 of the cylindrical vortex. The plates are attracted to each other with a force F defined as:

$$F = (\Delta P)(\Pi)(R)^2 \quad (2)$$

This represents the force that is generated by the invention herein to attract objects using a vortex attractor.

Figure 3:
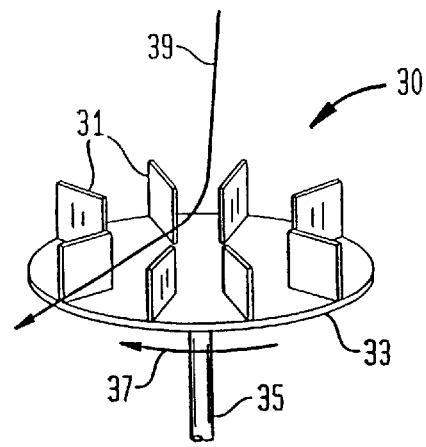
FIG. 3 depicts a conventional impeller.

A pattern of flow having a vortex of fluid, for example, as described above with reference to FIG. 2A having a pressure profile as shown in FIG. 2B, may be generated by directing fluid in a spinning motion. One apparatus which may generate a vortex fluid flow is depicted in FIG. 3. The impeller in FIG. 3 comprises vanes 31, backplate 33 and driveshaft 35. Energy is imparted upon driveshaft 35 which causes the impeller assembly of backplate 33 and vanes 31 to spin in a clockwise direction. This spinning motion causes fluid to flow as shown by arrow 39. Fluid is forced down along the axis of the impeller assembly and exits out tangentially from the vanes 31. The fluid leaving the impeller has two directional components: the radial component, exiting the impeller and depicted as arrow 39, and the rotational speed or velocity component 37. The result is that the fluid spirals away from the impeller. This spiral action results in a vortex of fluid flow above the impeller and its surroundings.

Figure 4A:
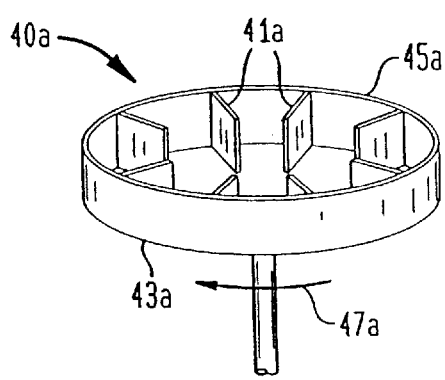
FIGS. 4A and 4B depict embodiments of the vortex generating apparatuses of the present invention.
Figure 4B:
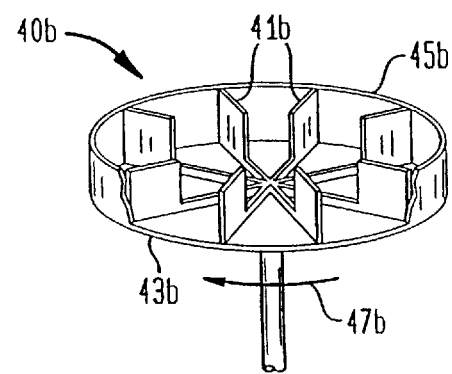

The vortex flow above the impeller is substantially improved by incorporating a shell around the impeller vanes. FIGS. 4A and 4B depict such apparatus. FIG. 4A depicts an apparatus where the impeller assembly 40a comprises vanes 41a and a shell comprising backplate 43a and containing wall or ring 45a. Backplate 43a and/or containing wall 45a may also contain one or more additional apertures or slits. These additional apertures or slits may be provided to minimize weight, for decorative purposes or to provide any desired functionality related to specific configuration or application. These additional apertures or slits may also be provided in order to generate external fluid flow for auxiliary functions or monitoring. The entire impeller assembly 40a is rotated by imparting a torque upon driveshaft 47a.

FIG. 4B depicts an apparatus where the impeller assembly 40b comprises vanes 41b, and a shell comprising backplate 43b and containing wall or ring 45b. The vanes 41b are rotated by imparting a torque upon driveshaft 47a while backplate 43b and containing ring 45b remain stationary. When the impellers of FIGS. 4A and 4B are spun, a vortex of fluid is created in a region above the impeller blades. As the containing wall is circular and is perpendicular to the backplate, a generally cylindrical vortex will be generated. The term "above" is used here since FIGS. 4A and 4B depict the apparatus in a position where the cylindrical vortex zone is generated in the direction from the driveshaft side of the backplate to the impeller side of the backplate. The vortex of fluid will be directed generally normal to the impeller side of the backplate and directed away from the impeller assembly.

Figure 5:
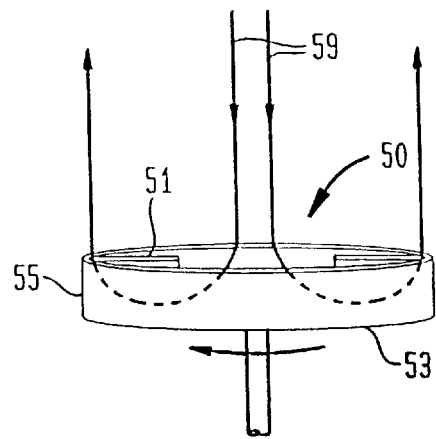
FIG. 5 depicts a general view of the fluid flow through the vortex impeller.

FIG. 5 depicts a general representation of the flow through the vortex impeller depicted generally in FIGS. 4A and 4B. The containing ring 55 changes the direction of the fluid flow exiting the vanes of the impeller such that the fluid is directed away from the impeller parallel to the wall of the containing ring 55. Flow 59 enters from the center of the impeller assembly 50 and exits radially through the vanes 51, and is then deflected along the inside wall of containing ring 55 and away from backplate 53.

Figure 6A:
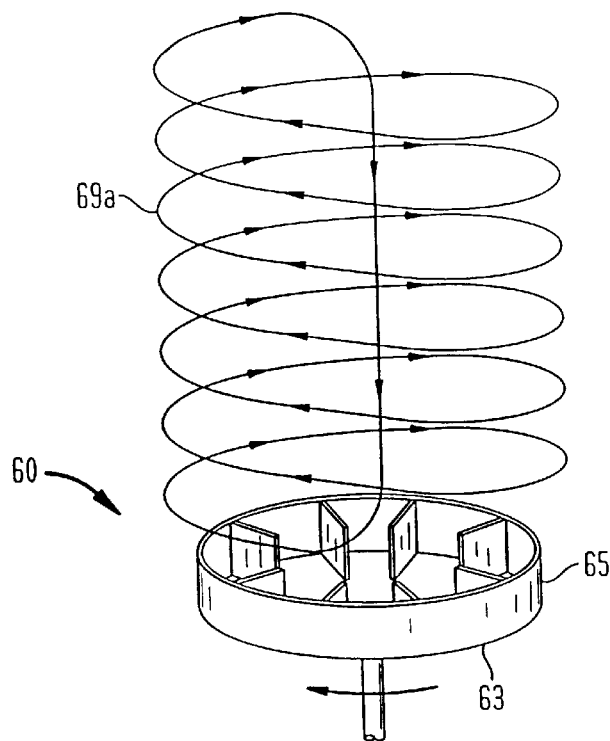
FIGS. 6A and 6B depict a vortex and the respective flow components.
Figure 6B:
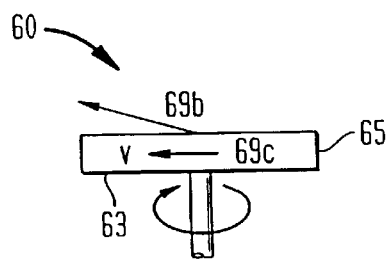

FIG. 6A and 6B depict a more detailed view of the fluid flow components of the vortex created by the apparatus depicted generally in FIGS. 4A and 4B. FIG. 6A shows fluid flow 69a as a continuous flow which is deflected away from the backplate 63 and tangentially along the inner wall of the containing ring 65. The fluid has a horizontal component due to the impeller rotation.

FIG. 6B shows the direction of the fluid leaving the impeller. The flow has a vertical and a horizontal component, creating a tangential flow 69b and a horizontal flow 69c.

The vortex depicted generally in FIG. 6A shows the fluid reaching a height and reentering the impeller assembly 60. The pressure inside the vortex apparatus is lower than the ambient fluid pressure. This prevents the fluid from flying outward due to the centripetal acceleration and leads to the upward spiral as shown. Because it is imparted against outside forces (e.g. friction), from the ambient fluid the flow velocity decreases. This causes a major component of the fluid flow to be drawn into the center of the flow region and toward the center of the impeller assembly. Without obstructions between impeller assembly 60 and flow 69a, the fluid flows continuously while the vanes of the impeller assembly spin.

Figure 7:
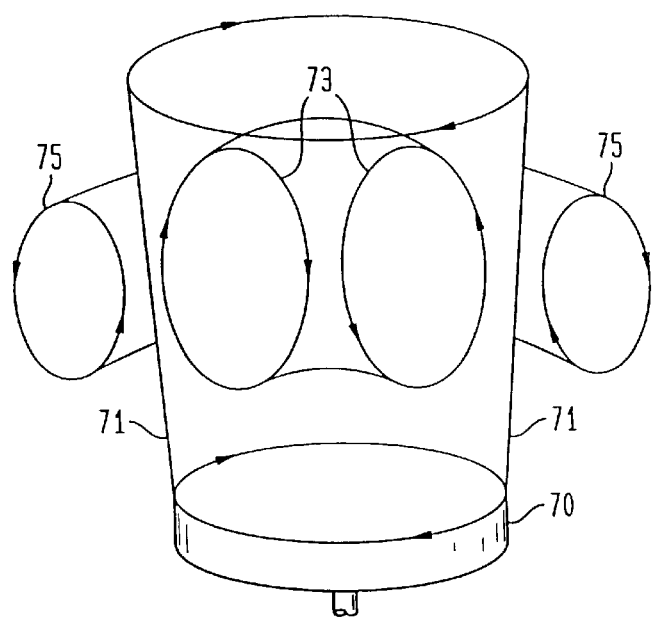
FIG. 7 depicts the various components of the overall fluid flow caused by the vortex generating apparatus of the present invention.

FIG. 7 depicts the several components of the fluid flow of the vortex apparatus. The major component is vortex 71 which rises up from the containing ring and is depicted as expanding outward as distance from the impeller assembly 70 increases. The vortex generated is actually frustoconical in shape; however, although it is described generally herein as cylindrical, the term encompasses frustoconical fluid flows. Within the cylindrical vortex is an inner toroidal vortex, depicted generally in cross section by arrows 73, which carries fluid out toward the inside walls of the cylindrical vortex 71 and around through the center of the cylindrical vortex 71 in a continuing pattern as shown by the cross section. This flow cross section depicted by arrows 73 is within the circumference of the cylindrical vortex. Outside the cylindrical vortex an additional toroidal vortex is created as shown in cross section by arrows 75. This toroidal vortex has a rising fluid flow toward the wall of the cylindrical vortex and descending away from the vortex as the distance from the impeller assembly 70 increases. This flow 75 is continuous around the circumference of cylindrical vortex 71. The energy of the outer toroidal vortex 71 is substantially less than that of the inner toroidal vortex 73.

Both inner toroidal vortex 73 and outer toroidal vortex 75 are created from energies created by the cylindrical vortex and as such reduce the cylindrical vortex energy. The inner and outer vortices are thus parasitic and reduce the vortex attraction.

The cylindrical vortex creates a barrier between the ambient fluid pressure and the lower than ambient pressure within the cylindrical vortex. Additionally, within the inner and outer toroidal vortices the pressure is lower than ambient. The lowest system pressure is within the inner toroidal vortex, as the pressure is reduced by both the inner toroidal vortex 73 and the cylindrical vortex 71.

Figure 8:
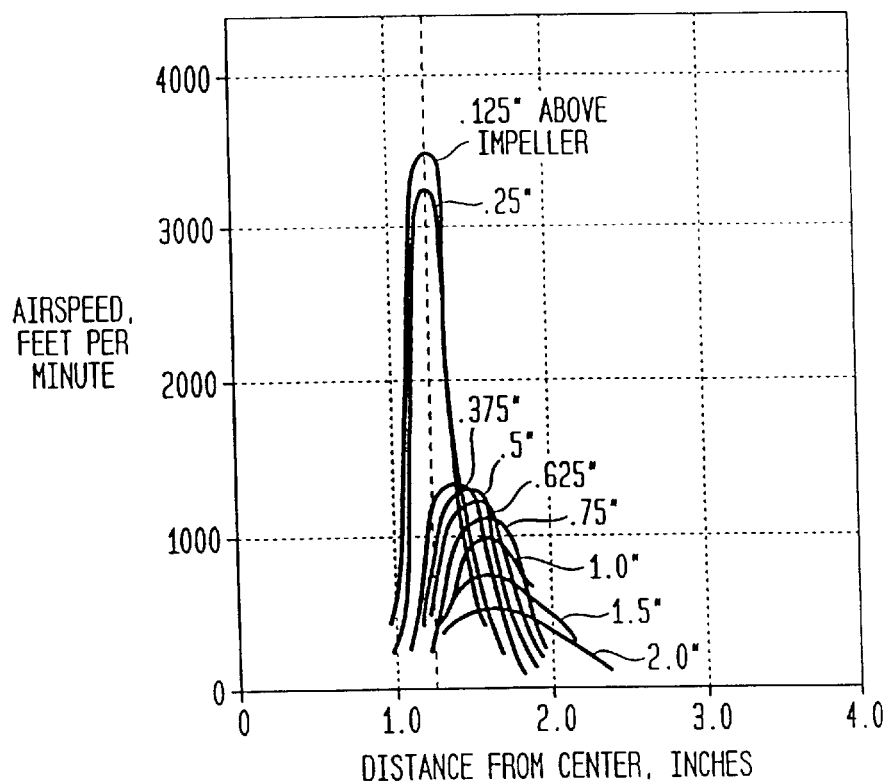
FIG. 8 is a chart of airspeed versus distance along the impeller for various distances from the vortex generating apparatus.
Figure 9:
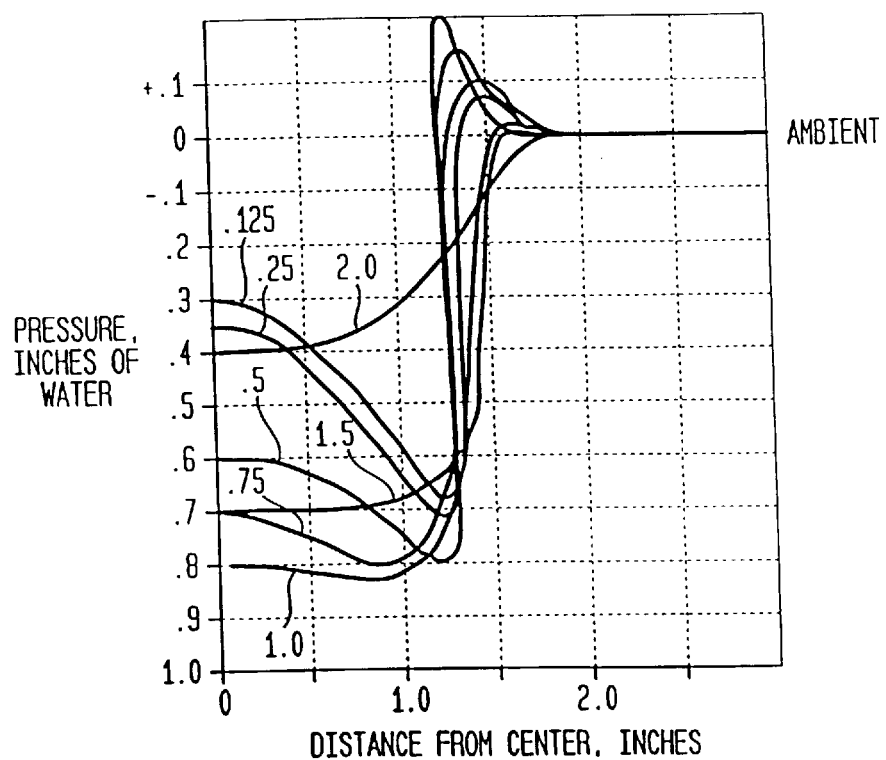
FIG. 9 is a chart of pressure versus distance along the impeller for various distances from the vortex generating apparatus.

The combination of these vortices creates a fluid flow and a pressure region that vary with distance from the vortex assembly and across the radius of the impeller. FIGS. 8 and 9 represent data resulting from tests performed with a vortex attractor having an impeller radius of 1.25 inches acting on air. FIG. 8 illustrates that the variation in airspeed in feet per minute with the distance from the center of the impeller in inches based on a tip velocity of 4000 feet per minute, and at various distances from the containing ring (i.e., 0.125 in., 0.25 in., 0.375 in., 0.5 in., 0.625 in., 0.75 in., 1.0 in., 1.5 in., and 2.0 in.).

FIG. 8 shows the airspeed decreases with increasing distance from the impeller. Also, the airspeed varies as the distance from the center of the impeller increases. These variations may be due to the effects of the toroidal vortices on the airflow through the cylindrical vortex. The airspeed is at a maximum at 0.125 in. from the impeller, and at 1.25 in. from the axis of the impeller, or at the wall of the containing ring. The lack of resistance acting upon the airflow allows high airspeed.

As the distance from the center of the impeller changes, the airspeed varies in accordance with the position of the toroidal vortices. At 1.0 in. from the axis of the impeller, the airspeed is very low even at a distance of 0.125 in. from the impeller. This is due to the portion of the inner toroidal vortex nearest the impeller blocking airflow. At 1.25" from the impeller radius, the airspeed is less affected by resistance from the inner toroidal vortex until the distance from the impeller is increased to 0.375 in. and greater. The dramatic loss in airspeed may be explained by the resistance from the portion of the inner toroidal vortex nearest the cylindrical vortex barrier. Also, as the distance from the impeller increases beyond the radius of the impeller, the outer toroidal vortex affects the airflow. For example, the airspeed measured at 0.375 in. from the impeller reached a maximum at approximately 1.5 in. from the center (i.e. impeller axis) or 0.25 in beyond outside of the containing ring. This may be caused by the outer toroidal vortex acting on the surrounding air at that point.

FIG. 9 charts the variation in pressure in inches of water with the distance from the center of the impeller in inches based on a tip velocity of 4000 feet per minute, and at various distances from the containing ring (i.e., 0.125 in., 0.25 in., 0.375 in., 0.5 in., 0.625 in., 0.75 in., 1.0 in., 1.5 in., and 2.0 in.). The lowest pressure is achieved at a distance of 1.0 in. from the impeller, and decreases to a minimum as the distance from the impeller axis increases to approximately 0.75 in., and rises sharply as the containing ring is approached (i.e., the distance from the impeller axis approaches 1.25 in.). At distances closer than 1.0 in. from the impeller, the pressure decreases to a minimum as the distance from the impeller axis increases to between 1.0 in and 1.25 in., at which point the pressure rises sharply. At distances further than 1.0 in. from the impeller, the minimum pressure is at the center of the impeller radius and increases as the distance from the impeller axis increases.

The pressure profile across the radius at different distances from the impeller is apparently affected by the toroidal vortices. For instance, at 1.0 in. from the impeller, the lowest pressure region is approximately 0.75 in from the axis. At 0 in. from the axis, there is only a slight variation. This corresponds with the central region of the cylindrical vortex, at a distance far enough from the impeller to be acted upon by the inner toroidal vortex. At a distance further from the axis, i.e., as the wall of the containing ring is approached, the pressure increases sharply to a pressure level slightly higher than ambient pressure. This is due to the resistance acting upon the cylindrical vortex barrier from ambient air and the outer toroidal vortex. As the distance from the axis increases further, the pressure approaches ambient, indicating the breakdown of the outer toroidal vortex.

Figure 10:
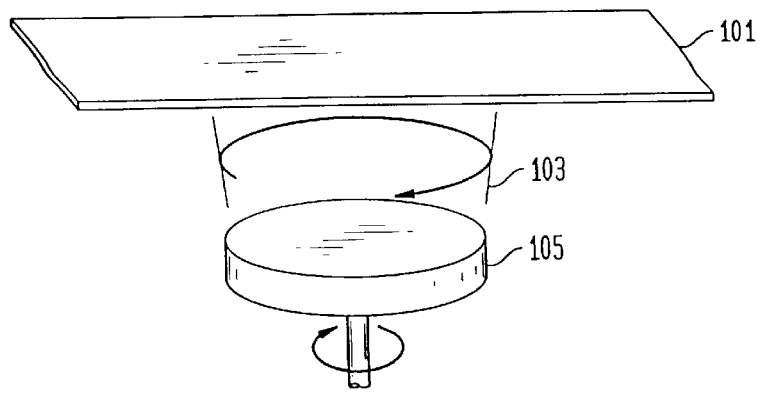
FIG. 10 depicts a vortex generating apparatus of the present invention and a flat plate some distance from the vortex generating apparatus.

The above descriptions of FIGS. 8 and 9 indicate the effects of the various components of the airflow as distance from the axis and distance from the impeller varies. These profiles, however, are dramatically affected when a flat plate is placed opposite the vortex attractor. A vortex is created such that the inner toroidal vortex is suppressed and a lower pressure is created between the plate and the impeller/containing wall assembly (as compared to the impeller/containing ring assembly without a flat plate some distance away). FIG. 10 generally shows this combination of the flat plate 101, cylindrical vortex 103 and impeller/containing wall assembly 105.

The low pressure region induced by the cylindrical vortex 103 between flat plate 101 and impeller/containing ring assembly 105 attracts flat plate 101 to impeller/containing ring assembly 105. When the plate becomes very close to the impeller/containing ring assembly 105, the low pressure created by the cylindrical vortex does not degrade because there is negligible resistance from outside fluid. The only resistance is the viscosity of the fluid existing within the system with no increased resistance from ambient fluid. The inner and outer vortices diminish as the plate moves closer to the impeller/containing ring assembly, and disappear when the plate and impeller/containing ring are in contact. This is due to the diminishing and eventual lack of interaction with ambient fluid. The pressure reduction is governed by equation 1, supra. When an object is adhered to the containing ring, the energy losses are solely from friction with the fluid within the system.

As the distance between the impeller/containing ring assembly and the flat plate increases, the inner and outer toroidal vortices form. However, though they still exist, the amplitudes of these ancillary vortices are lower with the flat plate as compared to a system without the flat plate. This is due to the plate blocking the fluid flow along the impeller axis toward the impeller/containing ring assembly.

Figure 11:
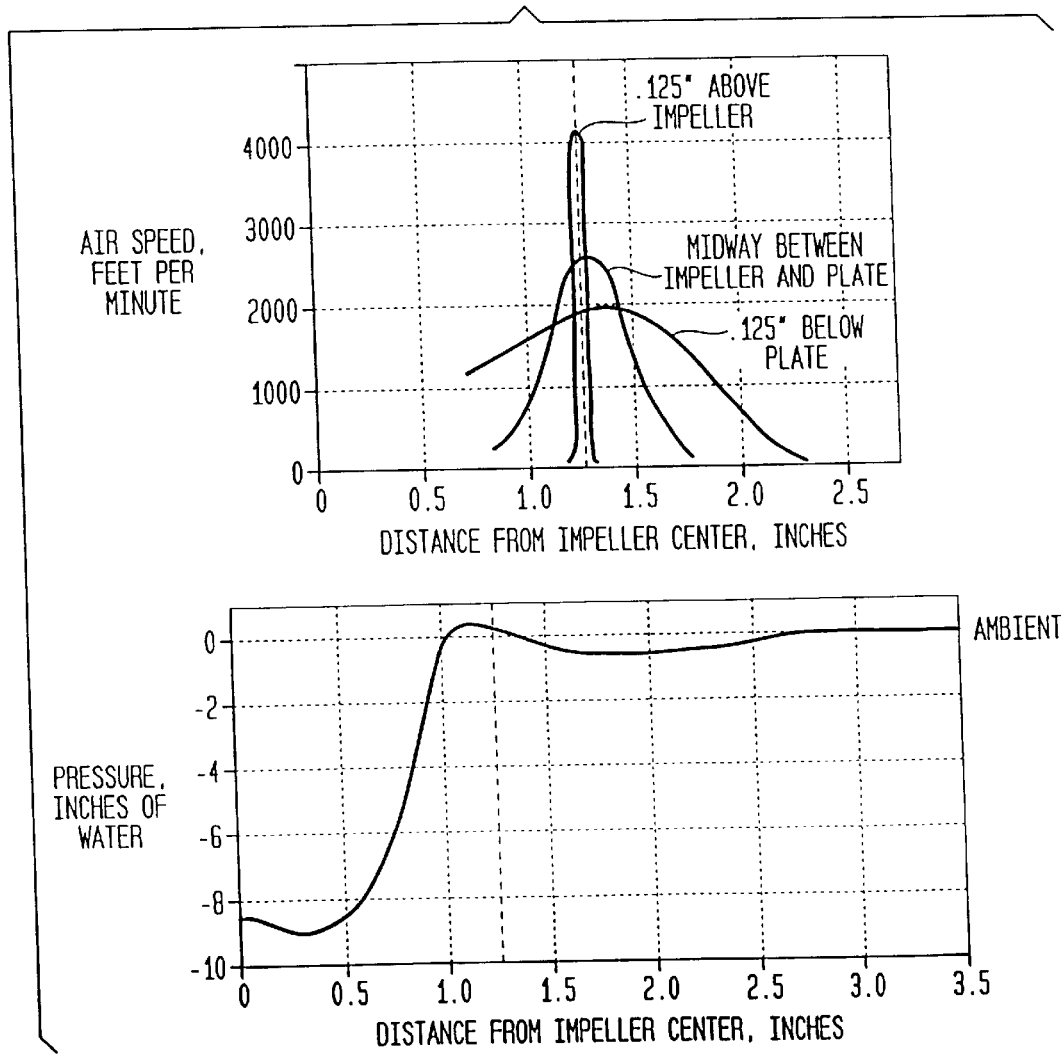
FIG. 11 charts the airspeed and pressure versus the distance from the center of the impeller/containing ring center for a vortex generating apparatus having a flat plate spaced a distance of 1.0 in. from the edge of the containing ring.
Figure 12:
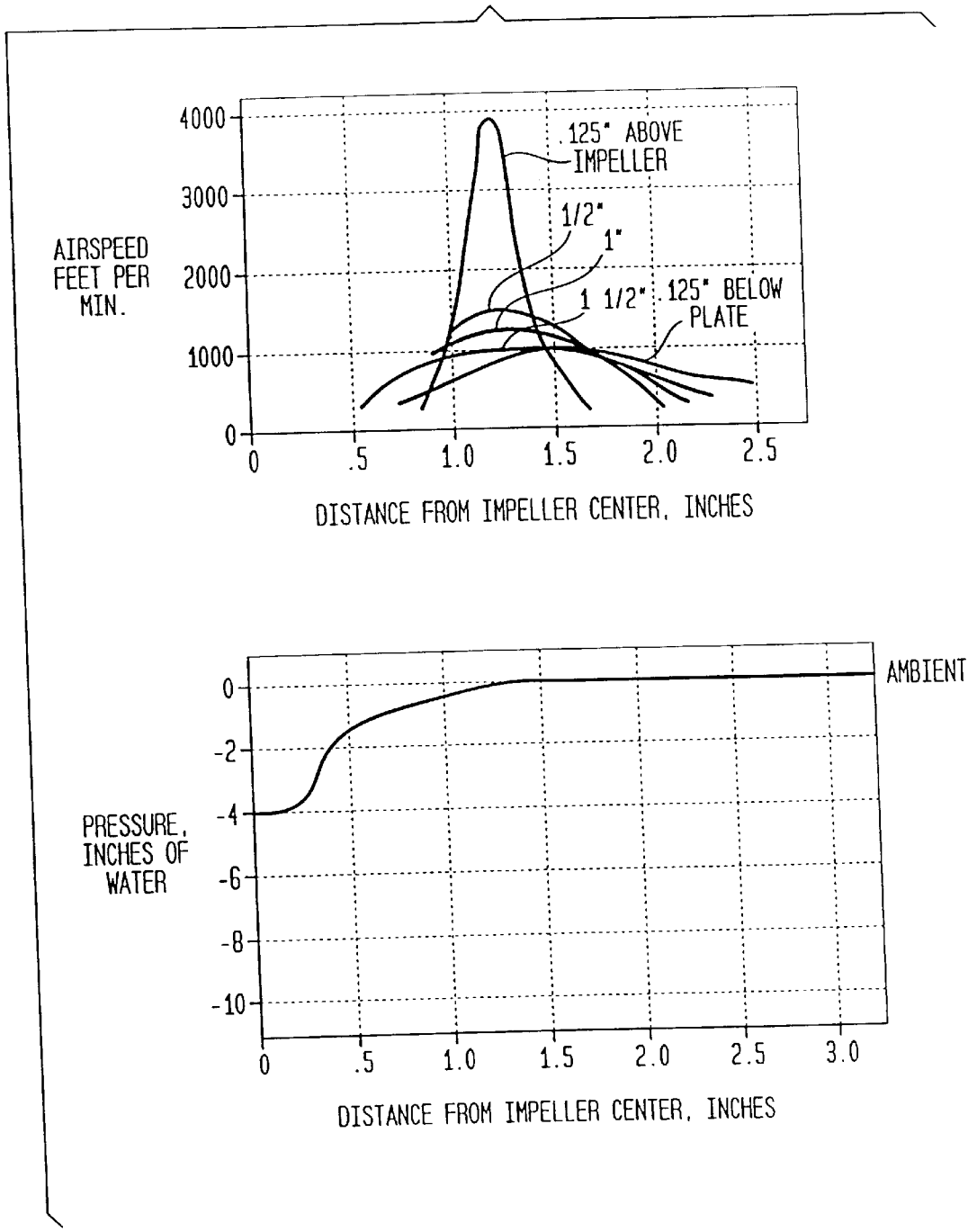
FIG. 12 charts the airspeed and pressure versus the distance from the center of the impeller/containing ring center for a vortex generating apparatus having a flat plate spaced a distance of 2.0 in. from the edge of the containing ring.

Using the same system as described above with reference to FIGS. 8 and 9, a flat plate was added at 1.0 in. and at 2.0 in. and airspeed and pressure were measured. FIGS. 11 and 12 chart airspeed and pressure versus the distance from an impeller/containing ring center for a vortex attractor with a flat plate at 1.0 in. and 2.0 in., respectively, having an impeller diameter of 2.5 in. with an impeller tip velocity of 4000 feet per minute. Comparing these results with those when there is no flat plate shows that the pressure reduction is over tenfold when there is a plate present. The effects of the plate on the airspeed is apparent from the charts in FIG. 11 and 12.

The magnitudes of the airflow measurements, both airspeed and pressure drop, are higher when the plate is present, as compared to FIG. 8 without a plate. The maximum airspeed in FIG. 8 is approximately 3500 feet per minute as compared to 4000 feet per minute when a plate is 1.0 in. from the impeller (FIG. 11) and 3800 feet per minute when a plate is 2.0 in. from the impeller (FIG. 12). Airspeed generally increases when there is a plate because the ambient air is partially blocked thereby reducing air resistance and also preventing or minimizing the formation of the toroidal vortices.

The low pressure region exhibits a much lower pressure when a plate is maintained near the impeller end as compared to the system without a plate. In FIG. 12, with a plate 1.0 in. from the impeller, the lowest pressure region is as low as −9 inches of water. Without the plate, the lowest pressure is slightly lower than −0.8 inches of water. This dramatic decrease in pressure when a plate is provided is likely due to the suppressed toroidal vortices. These vortices are suppressed by the lack of air resistance from ambient air.

The illustrations with specific configurations, dimensions, and the resulting data, represent one application of the invention. The operation with varying fluids, impeller configurations/sizes or shell configurations/sizes provide generally similar effects but with wide differences in scale.

The invention will be further described with reference to existing art. Although the vanes that create the vortex flow and the corresponding assembly may be referred to herein as "impellers", these impellers stand in sharp contrast to an impeller vacuum system. The impellers of a vortex attractor are not designed to move fluid through a system, as in a vacuum cleaner, but are designed to establish a low pressure zone while minimizing the effects from outside of the generated vortex flow of the system. Moving fluid in a self-contained system takes little energy because the kinetic energy applied to the fluid remains in the system. In contrast, moving fluid through a system takes a continuous supply of energy because the energy expended in moving fluid is continuously lost as the fluid is exhausted from the system.

Furthermore, when the vortex attractor and the flat plate are separated, the low pressure between them is reduced, i.e., pressure increases, and additional energy must be supplied to the impeller due to fluid circulation from ambient fluid into the impeller tube. However, less energy must be supplied as compared to a vacuum system that does not employ a vortex flow. A barrier to the outside fluid is established that provides the low pressure to a directed region relative to the impeller end of the attractor. In a vacuum system, there is a fluid exhaust, therefore continuous energy is expended in moving masses of fluid from a general region near the tube.

Figure 13:
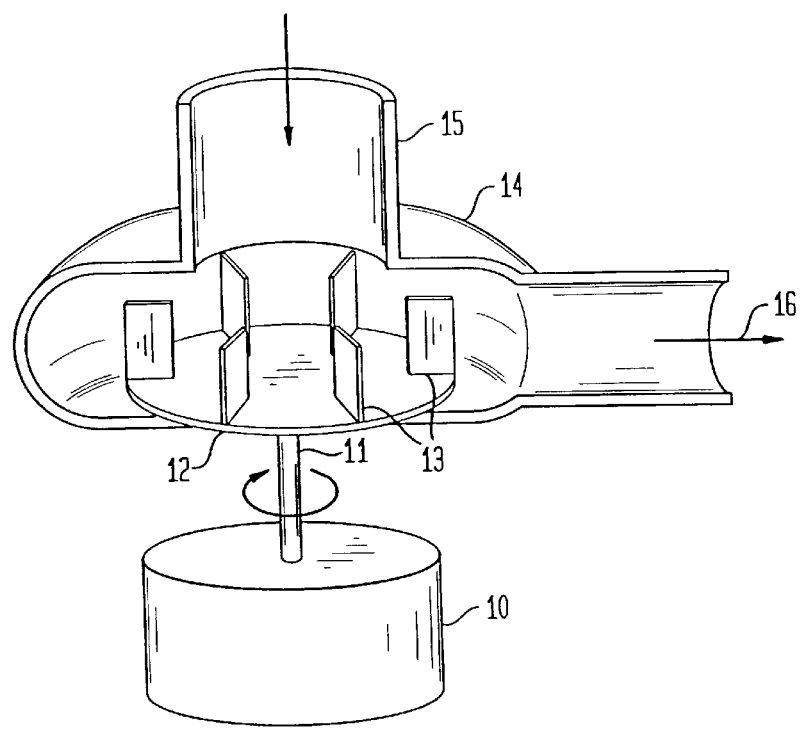
FIG. 13 is a prior art depiction of an impeller vacuum system.

A commonly known impeller vacuum system is shown in FIG. 13. A motor 10 drives driveshaft 11 which spins rotor 12 having an impeller comprising vanes 13. Vanes 13 are surrounded by an annular collector ring 14. A tube 15 opposite the center of vanes 13 allows fluid into the system. The spinning vanes 13 causes a circular fluid motion. The centrifugal force or centripetal acceleration throws the fluid out into the collector ring 14 where it is coupled to exhaust 16. It also reduces the pressure of the fluid in the center of vanes 13. Fluid is drawn through inlet 15 and through vanes 13 of the impeller to exhaust 16. The result is a continuous fluid flow through the system and a reduction of the fluid pressure at inlet 15. This state is maintained by continuously supplying energy to the fluid as it moves through vanes 13 of the impeller.

Figure 14A:
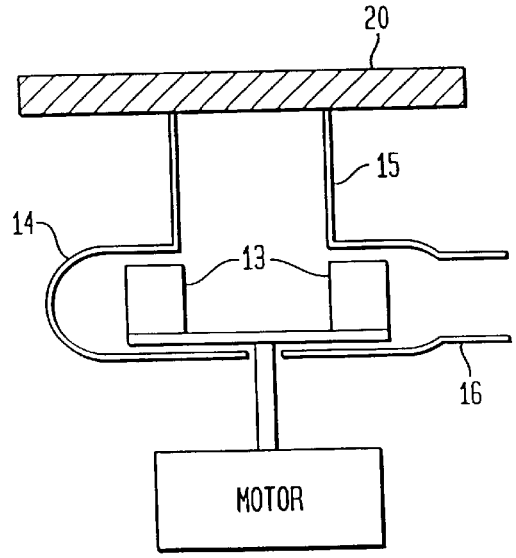
FIGS. 14A and 14B are diagrams of the stages of use of a prior art impeller vacuum system attracting a flat object.
Figure 14B:
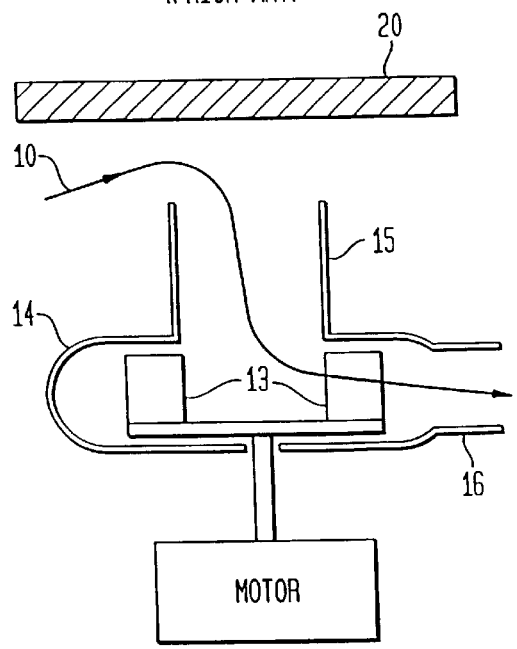

An impeller vacuum system can be used to attract objects close to the inlet. FIG. 14 shows two conditions, represented in FIGS. 14A and 14B. FIG. 14A depicts a flat object 20 covering the end of inlet tube 15. In this case there is no fluid flow through the system. Thus the fluid between vanes 13 of the impeller remains there and moves with vanes 13 at a constant circular velocity. There is a pressure difference across vanes 13 with a low pressure in the center of the impeller and inlet 15 and ambient pressure in collector ring 14 and exhaust 16. Under these conditions very little energy is required to maintain fluid movement. This phenomenon can be seen with a typical vacuum cleaner. If the end of the vacuum cleaner hose is covered, the motor speeds up indicating a reduction in the power requirement. The practical result is that the pressure difference between the ambient pressure at the top of the attracted object and the low pressure within the inlet tube holds the object onto its end.

The second example, depicted in FIG. 14B, shows an object 20 spaced a distance above inlet tube 15. Fluid flows in the space between object 20 and tube 15 down through vanes 13 of the impeller and through exhaust 16 (the fluid flow path is indicated with directional line 10). The pressure in the space between object 20 and tube 15 is lower than ambient but very much to the ambient pressure than that of the previous example. This is due to the restriction of the flow into the inlet by the attracted object. The force attracting object 20 and inlet 15 decreases rapidly as the object is moved away from the tube and the power to the impeller increases as fluid is moved through the system.

Figure 15:
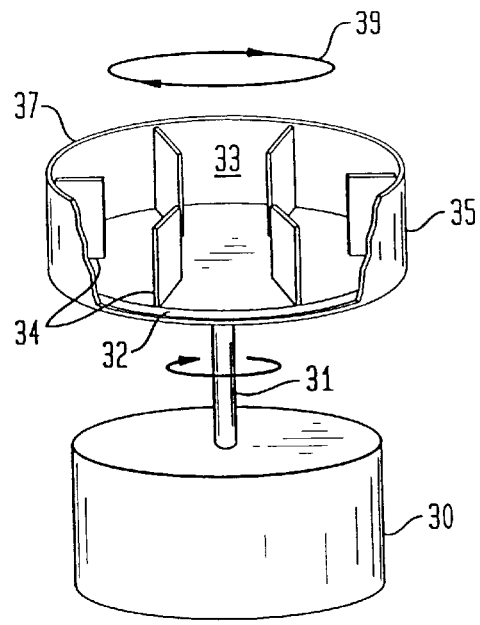
FIG. 15 depicts a cutaway drawing of an embodiment of a vortex attractor of the present invention.

FIG. 15 shows an embodiment of the vortex attractor of the present invention. In this example, a motor 30 drives driveshaft 31 which spins rotor 32. The type of motor used is irrelevant to the invention herein. Any device which has the capability of spinning driveshaft 31 is acceptable, such as battery motors, compressed air, solar powered motors, etc. Vanes 34 of impeller 33 are mounted upon rotor 32. As with the motor, the type of vane, vane configuration, impeller diameter and materials used can be varied depending on the particular application for the vortex attractor.

The spinning rotor throws fluid out from the center to containing ring 35 so that the pressure in the center is reduced above impeller end 37, as described in detail above. Unlike the vacuum system the fluid is contained by containing wall 35 and not coupled to a collector ring and exhaust. A circular fluid flow 39 is generated at impeller end 37. The overall result is that fluid flow through the system is limited, and efficiency is enhanced.

Figure 16A:
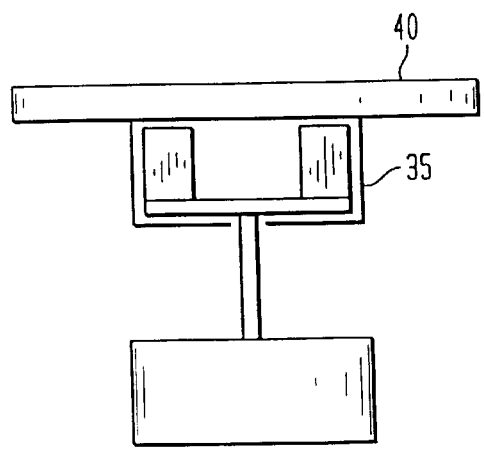
FIGS. 16A and 16B are diagrams of the stages of use of a vortex attractor attracting a flat object.
Figure 16B:
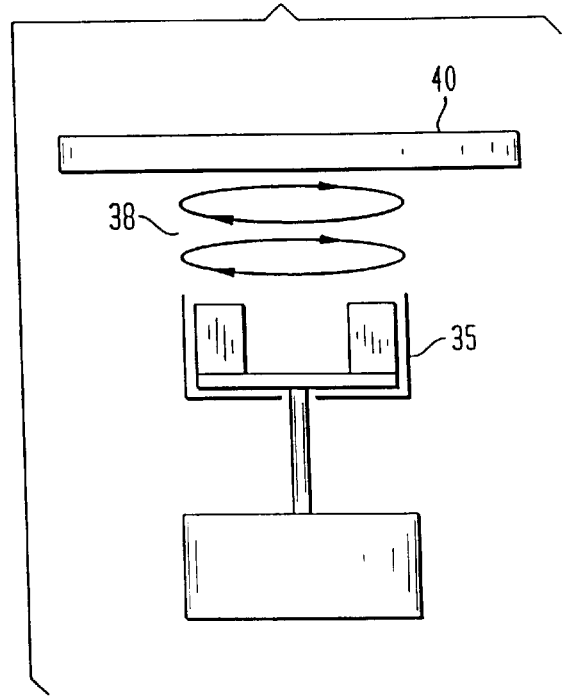

FIGS. 16A and 16B depict the vortex attractor establishing a low pressure between itself and a flat object 40. In the first example depicted in FIG. 16A the object lies on top of containing wall or ring 35 of the attractor. The impeller motion spins fluid out around the rim of the tube to establish a low pressure zone between the impeller and the object. The pressure drop is in this case the similar to the pressure drop in the vacuum system shown in FIG. 14A and very little power is required to maintain fluid circulation and attraction. In a sealed system, no fluid enters or leaves the impeller enclosure.

The second example depicted in FIG. 16B shows the attracted object 40 separated from the vortex attractor. In this case the vortex established by the impeller extends above containing ring 35 and terminates on the bottom surface of attracted object 40. Circular fluid flow 38 maintains a low pressure between the impeller and the object surface and hinders fluid from flowing in and out of containing ring 35. In this case a lower pressure is maintained between the attractor and object than in the vacuum system of FIG. 14B and less energy is expended in circulating the fluid. No energy is expended circulating fluid through a system as with a vacuum shown in FIG. 14B. Energy is expended only to overcome the viscosity of the fluid between the containing ring and the attracted object. Thus for a given amount of power the attraction between the impeller system of the vortex attractor is greater than that for the vacuum system as the distance between the attractor and the object is increased.

Figure 17:
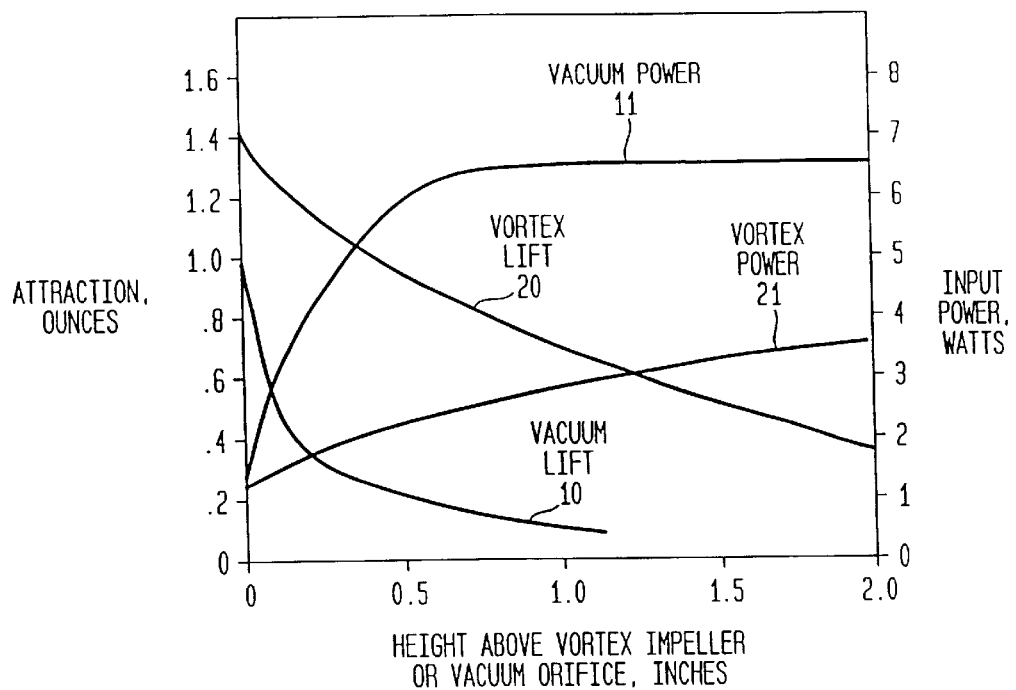
FIG. 17 charts the relationships between the distance from the impeller and both the attraction and input power of a vortex attractor and a vacuum impeller system.

The efficiency of vortex attractors as compared to vacuum impellers is demonstrated in FIG. 17, wherein the attractive forces and the input power are compared relative to the height above the impeller. For both the vortex system and the vacuum system, the fluid being acted on is air, the impeller diameter is 2.5 inches, and the impeller assembly consists of sixteen (16) vanes that each have an area of 0.4 square inches. The driveshaft in both systems is maintained at a constant speed of 6,000 revolutions per minute. The vacuum system tested uses a 2.5 inch diameter, 2 inch long suction tube connected to an impeller central inlet by a 1.25 inch diameter, 12 inch long tube.

The horizontal scale of the chart depicted in FIG. 17 represents the distance in inches of a flat plate from either the vortex attractor impeller or a vacuum system suction tube. The vertical scale on the left represents the attraction or attractive forces in ounces, and the scale on the right represents the input power in watts.

With respect to the prior art vacuum system, curves 10 and 11 represent the vacuum lift and vacuum power, respectively. At a plate distance exceeding one inch from the vacuum orifice or suction tube, the attraction of the vacuum system reduces to a negligible level of less than 0.1 ounce, while the power at the same distance is greater than 6.5 watts. The vacuum system tested had the highest attraction force when the plate and the orifice were in contact, i.e., zero height. At zero height, the vacuum system generated 1.0 ounces of attraction force at a vacuum power of approximately 1.3 watts. The vacuum system demonstrated a sharp increase in attraction forces as the height of the plate decreased from approximately 0.125 inches to zero inches.

In contrast, the results for the vortex attractor tested show both greater attraction and greater efficiency. First, the required input power or the vortex system is less than that of the vacuum system in all cases except at zero height, where the power may be equal. Even at zero height, with equal power, the vortex attractor generates over 1.4 ounces of lift compared to about 1.0 ounces of lift for the vacuum lift. As the distance between the plate and the impeller increases, the vortex lift decreases as the power increases. At 1 inch, where the lift of the vacuum is at about 0.1 ounces with a power input of about 6.5 watts, the vortex attractor maintains about 0.7 ounces of lift with a power input of less than 3 watts. The vortex attractor also maintains attraction at distances of 2.0 inches from the impeller (about 0.375 ounces attraction and 3.5 watts power input), whereas the vacuum system has negligible attraction at that distance.

The relationship of both the input power and the attraction is approximately linear over a range of heights above the vortex impeller. In the depicted chart, the power input increases at a rate of approximately 1 watt per inch and the attraction decreases at a rate of approximately 0.54 ounces per inch. These values will change with different assembles which are more or less efficient than the device tested. This relationship is useful in various applications, including control devices, sensors or detectors. Furthermore, the linear region provides enhanced predictability for determining power and height requirements for a suspending a load.

Various modifications of the impeller and shell configurations are possible which maintain the captive vortex forces. In the above descriptions, the impeller blades have been illustrated as flat plates for simplicity. In practice the blades may be curved in order to scoop fluid out from the impeller center towards the containing ring. They may be curved in order to deflect the fluid upward out of the containing ring. They may have an aerofoil section in order to minimize fluid resistance and maximize fluid movement. The blades may have a variable pitch in order to control fluid flow for controlled attraction, or shaped so that they can be turned in order to stop the vortex flow for rapid loss of attraction. The pitch of the blades may be controllable such that the vortex attractor can be easily adjusted for a variety of situations. Similarly the containing ring and backplate may have controllable apertures in order to rapidly reduce attraction, in addition to generating fluid flow outside the impeller for other purposes such as measurement control or to generate auxiliary power.

Figure 18A:
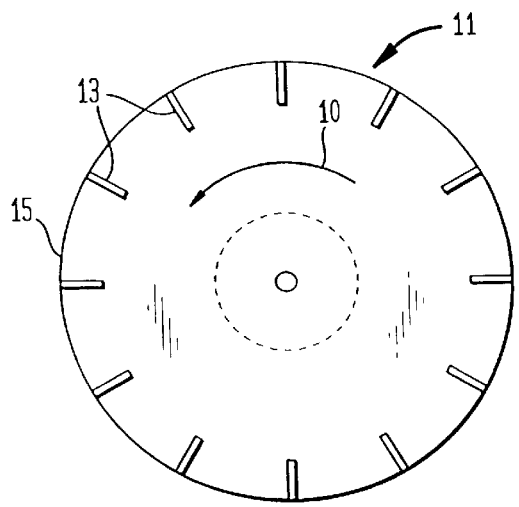
FIGS. 18A and 18B depict a vortex attractor assembly without a containing wall.
Figure 18B:
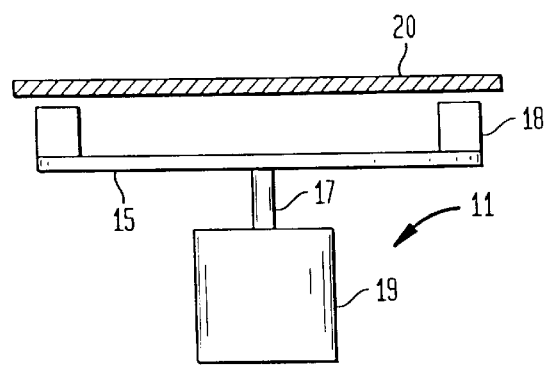

There are occasions when either the containing ring or the vanes may be entirely eliminated. FIGS. 18A and 18B, for example, depict a vortex attractor configuration without a containing ring. When vortex attractor 11 is located very close to attracted surface 20, the containing ring is not necessary. Vortex attractor 11 comprises vanes or impeller 13, backplate 15, driveshaft 17 and motor 19. Vanes 13 are attached to the peripheral edges of backplate 15. The spinning motion is achieved by power from motor 19 to driveshaft 17, which spins backplate 15. The vortex fluid flow is created between attracted surface 20 and the impeller end of attractor 11. Rotating impeller 13 causes circulating fluid flow between backplate 15 and attracted object 20. The centripetal acceleration of the fluid, depicted by arrow 10, forces fluid out radially through vanes 13 until equilibrium is achieved with fluid pressure inside the space between backplate 15 and attracted surface 20 being lower than ambient. Fluid cannot flow back into this space from the outside because of a vortex established between the top of vanes 13 and attracted surface 20 and the vortex attraction is as described for the case when a containing ring is present. The low pressure area between backplate 15 and attracted object 20 causes attraction as previously described.

As the space between the impeller end and attracted surface 20 is increased the degree of attraction rapidly decreases as fluid moving into the space above backplate 15 is expelled radially through vanes 13. The performance is similar to the vacuum system shown in FIG. 14 with a performance curve as depicted in FIG. 17, however the establishment of a vortex above vanes 13 reduces the rate at which attraction is reduced as separation of attractor 11 and attracted surface 20 increases. In an extreme case the height of the impeller vanes can be reduced to zero at which point fluid rotation is maintained by surface roughness. The attraction is not as great as when impeller vanes are installed and is useful when the backplate and attracted surface are in close proximity.

Figure 19A:
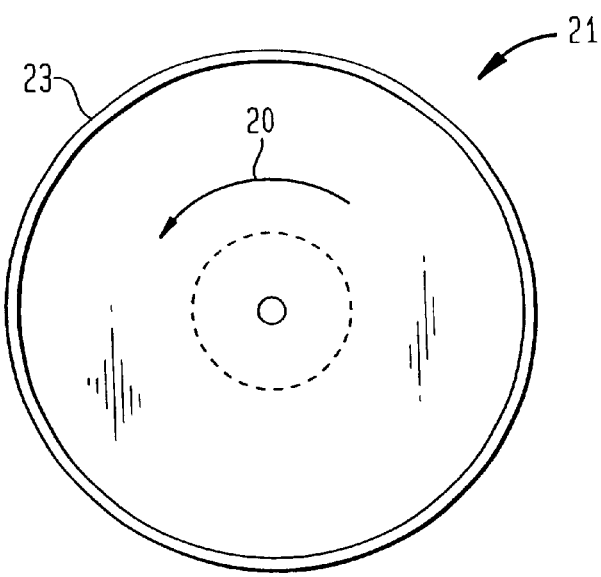
FIGS. 19A and 19B depict a vortex attractor assembly without impeller vanes.
Figure 19B:
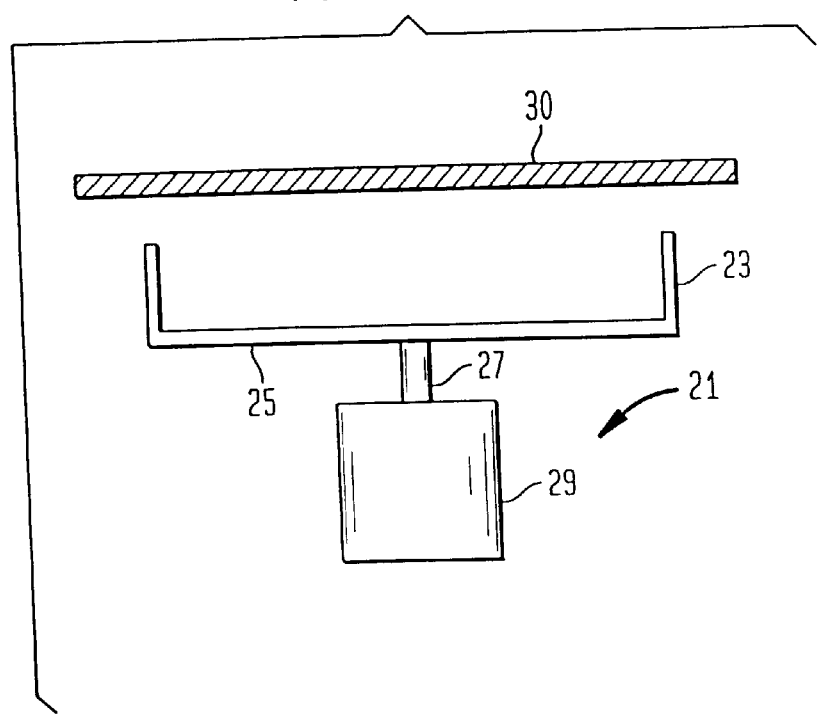

FIGS. 19A and 19B depict an additional embodiment of the vortex attractor of the present invention in which the vanes or impellers are eliminated. In this embodiment, vortex attractor 21 comprises containing wall or ring 23, backplate 25, driveshaft 27 and motor 29. Backplate 25, centrally attached to driveshaft 27, is caused to spin by activation of motor 29. The inside of containing walls 23, attached to the peripheral of backplate 25, are somewhat abrasive, and cause fluid in close proximity to move with it. Containing ring 23 acts as an inefficient impeller. The fluid flow is as previously described for an impeller with vanes and a vortex is established between containing ring 23 and attracted surface 30. The vortex flow is not as strong as when impeller vanes are installed and the attraction is consequently less. This configuration is appropriate, for example, when safety is a major concern because there are no projecting parts within the impeller assembly that can cause injury.

The centripetal acceleration of the fluid, depicted by arrow 20, forces fluid out radially along the inside of containing wall 23 until equilibrium is achieved with fluid pressure inside the space between backplate 25 and attracted surface 30 being lower than ambient. A vortex established between the top of containing wall 23 and attracted surface 3, thereby preventing fluid from flowing back into this space from the outside. The low pressure area between backplate 25 and attracted object 20 causes attraction as previously described.

Figure 20A:
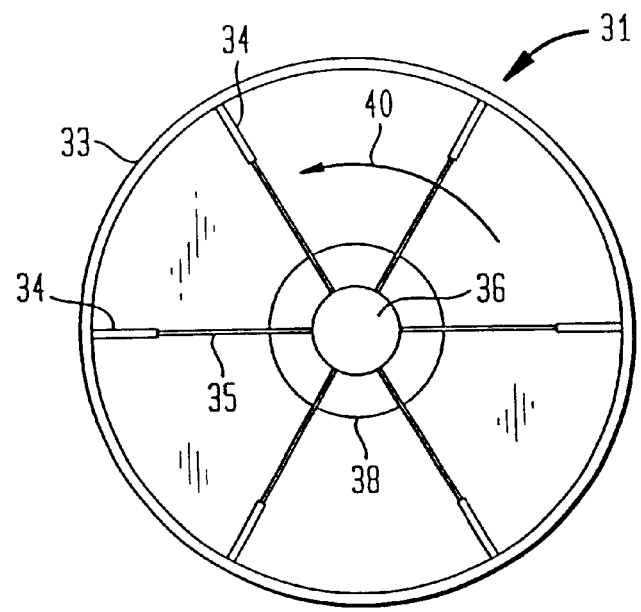
FIGS. 20A and 20B depict a vortex attractor assembly without a backplate.
Figure 20B:
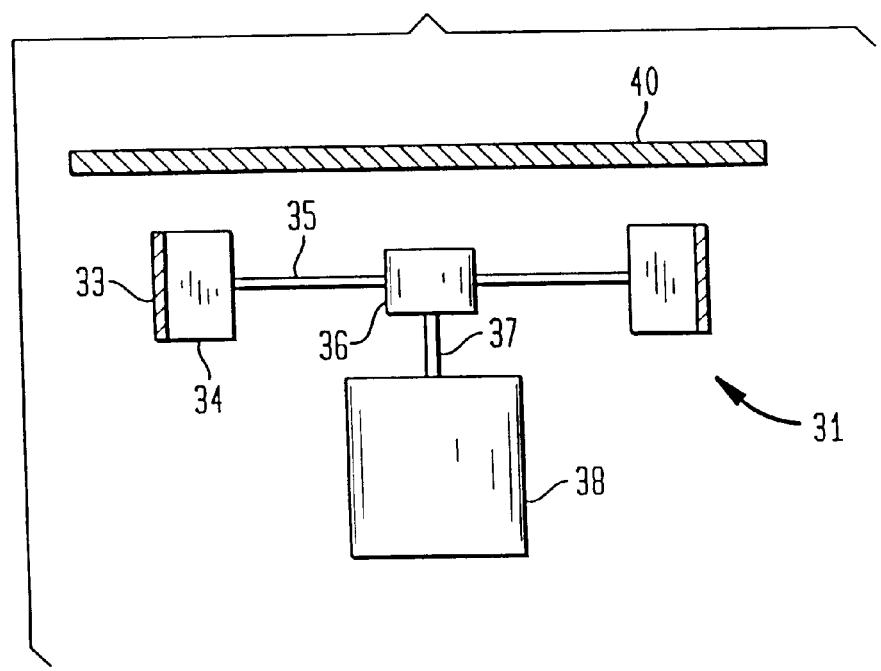

FIGS. 20A and 20B depict a vortex attractor in which the backplate has been eliminated. Attractor 31 comprises containing ring 33, vanes 34, vane supports 35, hub 36, driveshaft 37 and motor 38. Each of the vanes 34 are attached to individual supports 35, such as wires, to central hub 36. Hub 36 is spun in the direction depicted by arrow 40 by driveshaft 37, which is connected to motor 38. Upon actuation, spinning vanes 34 lead to cylindrical vortices forming above and below them. The lack of a backplate allows fluid to flow into the center of the impeller assembly (comprising vanes 34, vane supports 35 and hub 36) and reduce the pressure drop. Thus, while there is still an attraction to attracted surface 40, this attraction is generally less than the previous cases having a backplate. This configuration may be useful because it supplies low pressure circulating fluid below the impeller assembly which can be used for monitoring or measuring purposes or to power auxiliary systems.

Figure 21A:
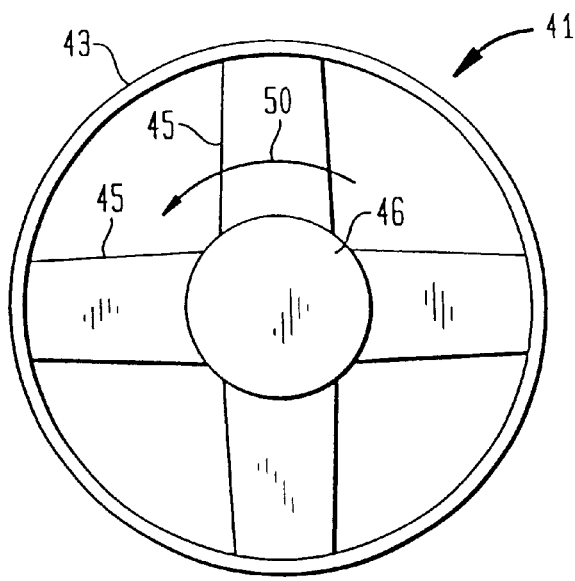
FIGS. 21A and 21B depict a vortex attractor assembly having propeller blades.
Figure 21B:
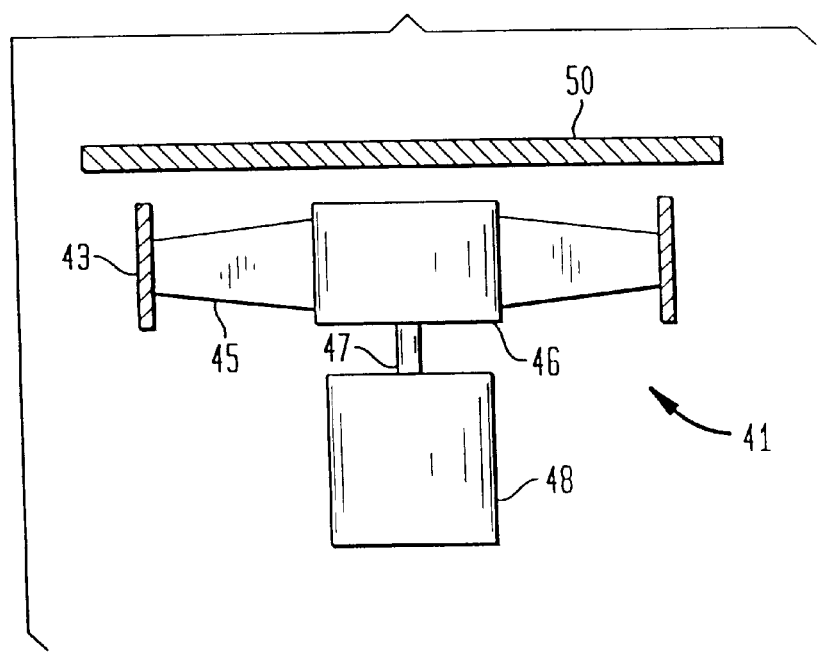

FIGS. 21A and 21B show a vortex attractor in which the backplate and vanes have been removed and a propeller or fan put in their place. Vortex attractor 41 comprises containing ring 43, blades or propellers 45, hub 46, driveshaft 47 and motor 48. Blades 45 are caused to spin in the direction indicated by arrow 50 by action from driveshaft 47, which is attached to motor 48. Containing ring 43 may be attached to blades 45 and rotate with them, or containing ring 43 may be a separate, stationary ring. Preferably, blades 45 are on an angle in this application.

Rotating blades 45 generate cylindrical vortices both above and below the propeller assembly (comprising blades 45 and hub 46). Above the propeller the action is as previously described with fluid being spun out of the space between containing ring 43 and attracted object 50 to produce a low pressure area above the propeller assembly, which causes attraction to surface 50 above.

The vortex generated below the propeller assembly is not terminated in a backplate, thus collapses in on itself with fluid moving from behind the propeller assembly back toward the center. The blade angle repels this fluid back downward and prevents it from reaching the space between blades 45 and attracted object 50. The performance as a vortex attractor is somewhat less than that for the preferred arrangement having a backplate due to power required in circulating the fluid below the propeller blades.

It should be noted that blades 45 do not operate as a propeller in the traditional sense since no fluid passes through them. The action on fluid above blades 45 is similar to the action with an impeller assembly, which pushes fluid horizontally and centripetally. The action on fluid below blades 45 prevents it from being sucked back through blades 45 and diminishing the vortex attraction with respect to attracted surface 50. This is the reverse of a propeller's normal function.

The propeller function is useful in cases where a vortex attractor at ground level can be made to fly up to the ceiling level by helicopter action of the propeller blades, and when the ceiling is reached the operation automatically changes over to that of a vortex attractor. The attractor mode consumes far less power than the helicopter mode. Various parameters such as blade pitch may be varied to operate efficiently in either mode.

Propellers are well known in the art as are propellers operated in ducts, known as ducted fans. This application differs in that it has a propeller serving a dual purpose—that of a helicopter, and also that of a vortex attractor.

Figure 22A:
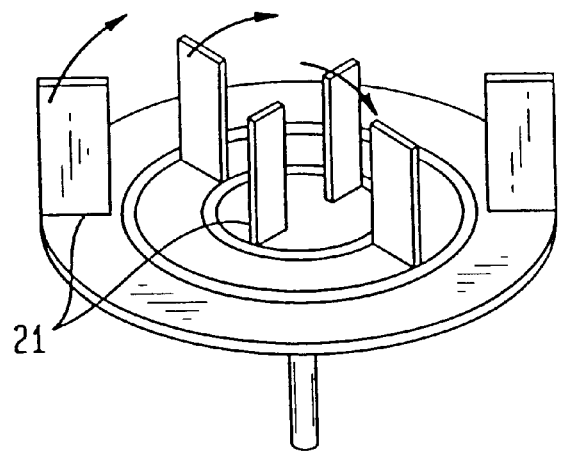
FIGS. 22A and 22B depict an embodiment of the present invention using a multiple impeller system.
Figure 22B:
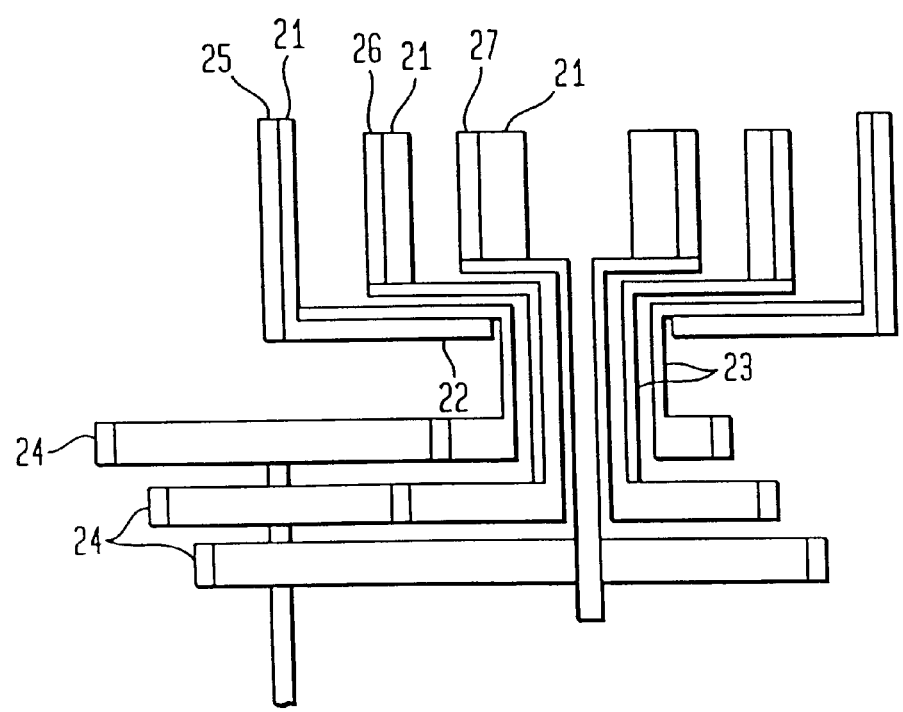

As discussed supra, these systems produce a captive vortex fluid flow similar to that produced by a tornado. A tornado is an example of a vortex system that is stable along the length or height of its axis for many multiples of its diameter. To reproduce this effect the fluid pressure must decrease from the outside of the circular path to the inside. Consequently, if the rotational speed of the fluid increases from the outside to the inside of the vortex, an enhanced attractive fluid flow results. This increase in rotational velocity can be achieved, for example, by a series of concentric impellers mounted as shown in FIGS. 22A and 22B. Impeller blades 21 are driven by a series of gears comprising gear assembly 24 that increase the rotational speed from the outer to the inner impellers (note that only two per ring are depicted for clarity—more than two may be used). Between gear assembly 24 and backplate 22 is an assembly such as a bearing assembly including concentric shafts 23, which minimize the flow of fluid through the backplate to impeller blades 21. In an embodiment of the impeller arrangement depicted in FIG. 19, each assembly of impellers are separated by individual containing rings 25, 26 and 27 (note that in FIG. 22A, containing rings 25, 26 and 27 are not depicted for clarity).

Figure 23:
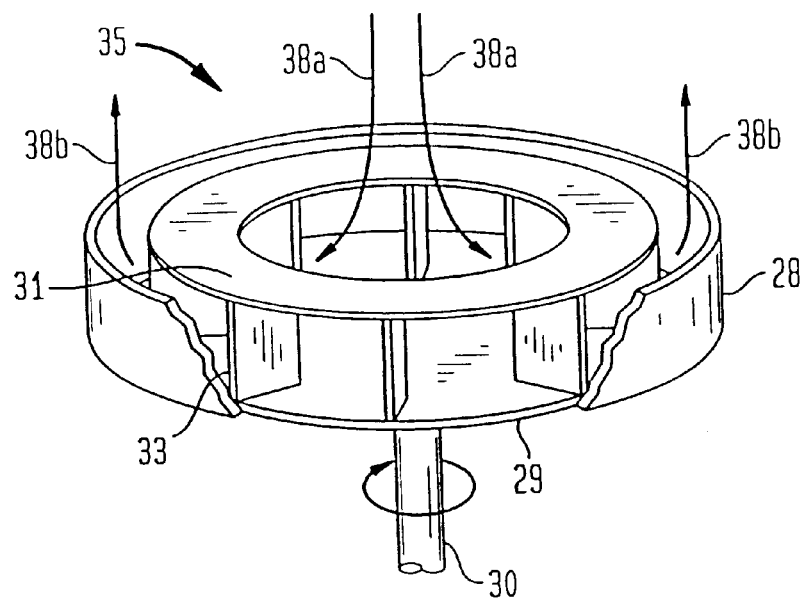
FIG. 23 shows an example of a safety plate for a vortex attractor.

An example of a protective covering for, a vortex attractor is depicted generally in FIG. 23. A vortex attractor is provided having containing wall 28, backplate 29 and driveshaft 30. Additionally, cover 31 prevents contact directly with impeller blades 33 from open impeller end 35. Fluid flow 38a enters into the region about the impeller axis and flow 38b exits from the region between the inside of containing wall 28 and the tips of impeller blades 33. The plate does not effect the fluid flow, as the center region nor the region between the tips of the blades and the containing wall are covered. This plate may also be replaced by a series of concentric rings, a spiral ring, or other type of screen which does not impede fluid flow. Furthermore, the containing wall may have a portion which extends toward the impellers, as described with reference to FIGS. 26A and 26B, infra. Preferably, such a shell geometry includes slits at the edge of the portion of the containing wall extending over the impellers.

Examples of the functional uses of the vortex attractor are depicted herein and described with reference to certain drawings herein. These examples are not intended to limit the invention. Rather, they are provided merely to illustrate uses, configurations and added components.

Figure 24:
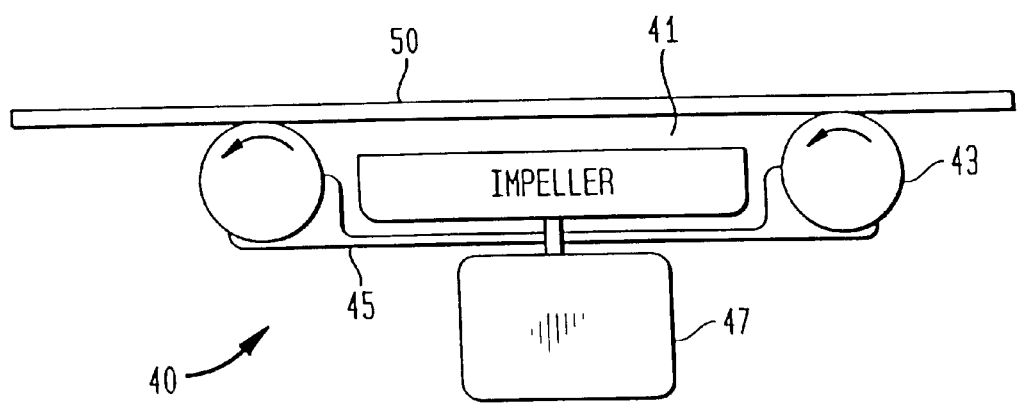
FIG. 24 depicts an example of a traversing vortex attractor.

An example of a traversing vortex attractor is depicted in FIG. 24. Generally, FIG. 24 depicts climbing attractor 40 having impeller 41, wheels or casters 43, frame 45 and motor 47. Impeller 41 is positioned within a pocket formed in mounting frame 45. This pocket serves the purpose of the containing wall and backplate described above. Furthermore, wheels or casters 43 are provided. These wheels or casters may be driven by motor 47, which drives the impeller, or by a separate motor (not shown). Traversing attractor 40 remains attracted to ceiling or wall 50 when the impellers are driven. The space between impeller 41 and ceiling or wall 50 is sufficient to clear any obstacles that may be encountered. Wheels or casters 43 provide traction and control to traversing attractor 40. If casters of the ball-bearing type are provided rather than wheels, traversing attractor 40 may traverse in any direction or angle with ease. As discussed above, a traversing vortex attractor has numerous uses, including toys, transport, surveillance, painting, repairs, etc.

Figure 25A:
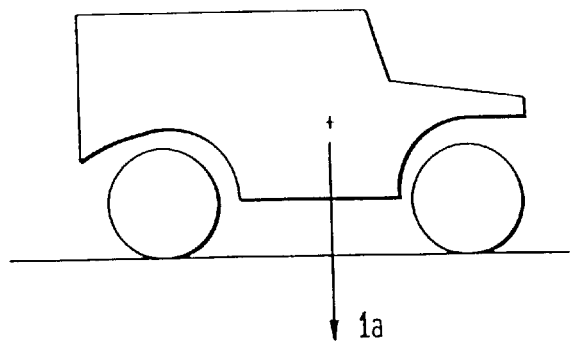
FIGS. 25A, 25B and 25C depict the forces acting on a vehicle on a flat surface and an inclined surface, and the resultant force with the inclusion of a vortex attractor on the underside of a vehicle.
Figure 25B:
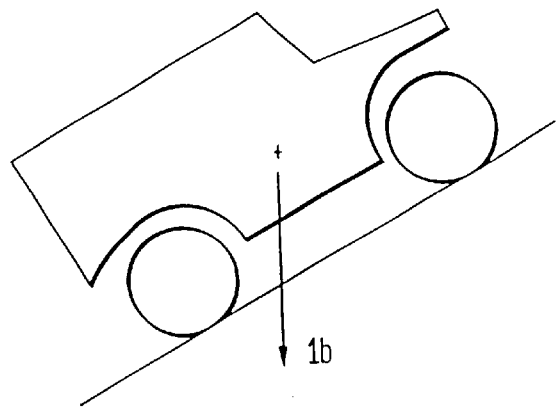
Figure 25C:
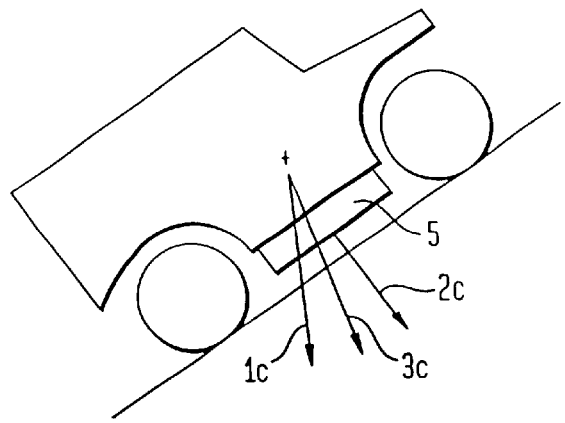

A further use of the vortex attractor is as a stabilization mechanism for vehicles traversing an incline. FIG. 25A–25C depicts the forces acting on a vehicle both on a flat surface and on an inclined surface. FIG. 25A shows a vehicle on a flat road with the gravity force due to its mass being exerted vertically downwards from the center of gravity (depicted as a "+" symbol in FIGS. 25A–25C), as represented vector 1a. In a four wheel drive vehicle the force ideally acts centrally between the axles. In a front wheel drive system the gravity force should center closer to the front axle. FIG. 25B shows the same vehicle on an inclined road. The gravity force, vector 1b, again extends from the center of gravity, but due to the incline acts closer to the rear axle. Most of the weight is carried on the rear wheels and little on the front wheels. This makes the vehicle unstable and traction becomes inefficient leading to wheel slip. When the incline is further increased (not shown), the gravity component acts behind the rear axle and the vehicle tips over backwards.

FIG. 25C depicts the addition of one or more vortex attractors 5 mounted beneath the vehicle. If more than one vortex attractor is used, they are preferably symmetrical with respect to the vehicle's center of gravity. Attractors 5 provide an additional force component, depicted as vector 2c, toward the road. Force 2c, when combined with gravitational force 1c, provides an overall resultant force depicted as vector 3c. Vector 3c extends further toward the front of the vehicle than gravity vector 1c. That is, more downward force is applied toward the front axle and stability is restored.

It should be noted that the force 2c from vortex attractor 5 is at a right angle to the road. Thus, there is no effect on propulsion or braking. While not depicted, similar effects occur when the vehicle travels downhill or on a lateral slope. The vortex attractors maintain stability. Preferably, the vortex attractor is equipped with stone guards for safe operation. The source of power for the impeller may be from the vehicle engine or from a separate source.

Figure 26A:
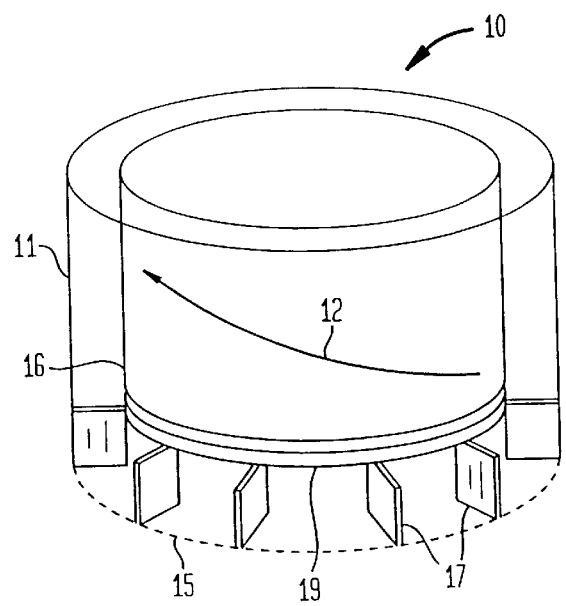
FIGS. 26A and 26B depict a variation of the vortex attractor of the present invention.
Figure 26B:
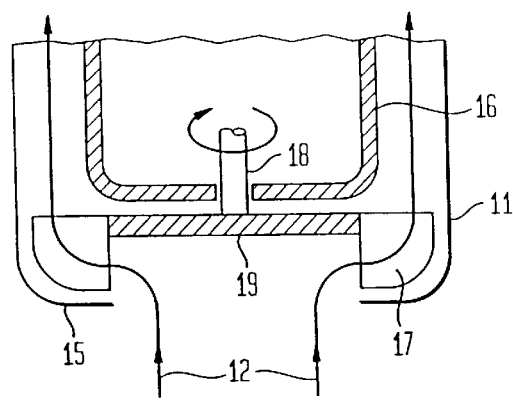

Alternative shell arrangements may provide the same attractive vortex flow. For example, the shell may comprise an outer shield and an inner shield. This arrangement is generally depicted in FIGS. 26A and 26B. FIGS. 26A and 26B depict vortex attractor 10 having outer shield 11 and inner shield 16. The device also includes impeller blades 17, driveshaft 18 and optional backplate 19 (note—backplate 19 may be eliminated, using the base of inner shield 16 to block fluid flow). As depicted in FIG. 26B, outer shield 11 is shaped to cover the impeller blades. This may be substituted for an additional safety ring or plate, for example, as described above and depicted below.

Upon activation of the impellers, helical vortex fluid flow 12 is created. FIG. 26A depicts the tangential portion of helical vortex flow. The vertical component of fluid flow 12 is depicted in FIG. 26B. Helical fluid flow 12 enters through the region about the impeller axis, and is spun tangentially between the inside wall of outer shield 11 and the outside wall of inner shield 16. The attractive forces are generated toward impeller end 15. This device may be used in the same manner as the vortex attractor having a shell comprising a containing wall and a backplate.

Figure 27:
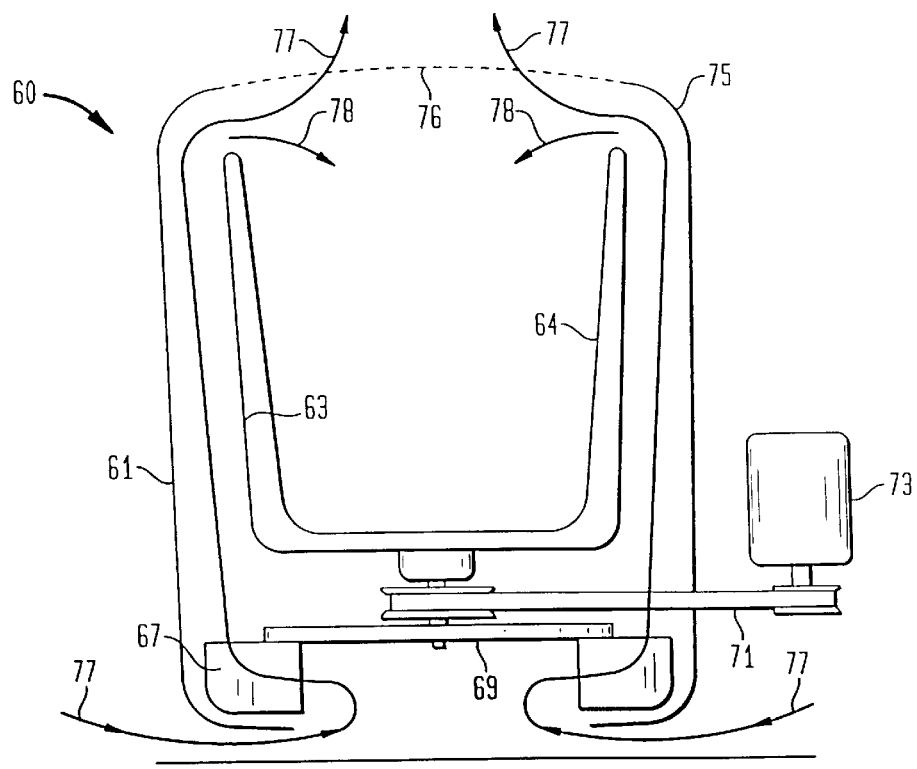
FIG. 27 depicts an attractor incorporating a variation of the vortex attractor of the present invention.

An depiction of a device that utilizes the variation provided in FIGS. 26A and 26B is a leaf or waste collector and bagger, shown generally in FIG. 27. Collector 60 comprises outer shield 61, inner shield and container 63, impeller blade 67, backplate 69, drive belt 71 and drive motor 73. Additionally, a bag may be provided within the inner shield to collect debris, as depicted by liner 64. The top of the assembly includes a removable cover 75 having screen 76 centrally positioned thereon. The path of airflow is represented by directional arrows 77, and travels through the region about the impeller axis, through the area between outer shield 61 and inner shield 63 and exits through screen 76. Leaves or other light debris travels along generally the same path, except the debris falls in the direction represented by arrows 78 into liner 64 within container 63 for collection.

At the impeller end of collector 60, the outer shield is curved to cover the impeller. This is similar to the description above with reference to FIGS. 26A and 26B. Alternatively, a plate or series of rings may be used to cover the impellers. However, the curved impeller end of outer shield 61 is preferred as it allows wheels, tracks or casters to be mounted thereon. This device may also be converted into a self bagging grass mower by adding a cutting blade on the driveshaft below the outer shield. This arrangement improves existing mowers as the attractive forces aid to extend the blades of grass as well as collect the cuttings or other debris.

While the present invention has been described with reference to one or more preferred embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

We claim:

1. A method for providing a substantially recirculating cylindrical vortex fluid flow creating a low pressure region comprising the steps of:

providing one or more rotatable impeller vanes coupled to a containing ring;

rotating said impeller vanes;

reducing parasitic fluid flow through said impeller vanes; and constraining said low pressure region to a desired location;

wherein said substantially recirculating cylindrical vortex fluid flow creates a low pressure region that results in an attractive force.

2. A method according to claim 1 wherein said reducing is performed by a backplate coaxially mounted with said impeller vanes having a front side and back side.

3. A method according to claim 2 wherein said backplate further comprises a plurality of apertures.

4. A method according to claim 2 wherein said backplate is planar.

5. A method according to claim 2 wherein said impeller vanes are fixably attached to a side of said backplate.

6. A method according to claim 2 wherein said constraining is performed by the containing ring which has walls circumferentially surrounding one or both sides of said backplate.

7. A method according to claim 6 wherein said walls of said containing ring are perpendicular to said backplate.

8. A method according to claim 1 wherein said impeller comprises vanes that are flat.

9. A method according to claim 1 wherein said constraining is performed by the containing ring which has walls.

10. A method according to claim 9 wherein said walls of said containing ring are continuous.

11. A method according to claim 9 wherein the periphery of said containing ring is circular.

12. A method according to claim 9 wherein the walls of said containing ring are of a height similar to said impeller vanes.

13. A method according to claim 9 wherein said containing ring is of greater height than said impeller vanes.

14. A method according to claim 1 wherein said rotation is performed by:

providing a drive shaft to transfer a torque; and providing a rotation device coupled to said drive shaft providing a torque thereto.

15. A method according to claim 14 wherein said drive shaft is flexible.

16. A method according to claim 14 wherein said rotation device is capable of effecting said drive shaft rotation at variable rates.

17. A method according to claim 14 wherein said drive shaft is coupled to said backplate.

18. A method according to claim 1 wherein said rotation is powered by electricity.

19. A method according to claim 1 wherein said rotation is powered by a combustion type engine.

20. A method according to claim 1 wherein said rotation is powered by a mechanical stored energy device.

21. A method according to claim 1 wherein said rotation is powered by compressed gas.

22. A method according to claim 1 wherein said rotation is powered by an integrated mobile power source.

23. A method according to claim 1 wherein said fluid flow is cylindrical.

24. A method according to claim 1 wherein said fluid flow is frustoconical.

25. An apparatus for generating a substantially recirculating cylindrical vortex fluid flow comprising:

backplate structure comprising a substantially circular member, said member having a substantially larger diameter than thickness;

at least one vane structure coupled to said backplate structure;

containing ring structure aligned with and coupled to the substantially circular periphery of said backplate structure, said containing ring having a height; and rotation means for generating a torque;

whereupon rotation of said vane structure, said apparatus generates a substantially recirculating cylindrical vortex fluid flow.

26. An apparatus according to claim 25 wherein said backplate structure further comprises a plurality of apertures.

27. An apparatus according to claim 25 wherein said backplate structure is planar.

28. An apparatus according to claim 25 wherein said vane structure is fixably attached to a side of said backplate structure.

29. An apparatus according to claim 25 wherein said vane structure comprises at least one vane that is flat.

30. An apparatus according to claim 25 wherein said containing ring structure surrounds the entire periphery of said backplate structure.

31. An apparatus according to claim 25 wherein said containing ring structure is aligned perpendicularly to said backplate structure.

32. An apparatus according to claim 25 wherein the periphery of said containing ring structure is circular.

33. An apparatus according to claim 25 wherein said height of said containing ring structure is similar to the height of said vane structure.

34. An apparatus according to claim 25 wherein said height of said containing ring structure is greater than the height of said vane structure.

35. An apparatus according to claim 25 wherein said rotation means comprises:

a drive shaft to transfer a torque; and a motor coupled to said drive shaft.

36. An apparatus according to claim 35 wherein said drive shaft is flexible.

37. An apparatus according to claim 25 wherein said rotation means is capable of effecting rotation at variable rates.

38. An apparatus according to claim 35 wherein said drive shaft is coupled to said backplate structure.

39. An apparatus according to claim 25 wherein said rotation means is powered by electricity.

40. An apparatus according to claim 25 wherein said rotation means is powered by a combustion type engine.

41. An apparatus according to claim 25 wherein said rotation means is powered by a mechanical stored energy device.

42. An apparatus according to claim 25 wherein said rotation means is powered by compressed gas.

43. An apparatus according to claim 25 wherein said rotation means is powered by an integrated mobile power source.

44. An apparatus for generating a substantially recirculating cylindrical vortex fluid flow, wherein said fluid flow creates a low pressure region and a corresponding attractive force, said apparatus comprising:

an impeller;

a containing ring surrounding the periphery of said impeller and coupled to the impeller; and a motor coupled to said impeller.

* * * * *